United States Patent
Cotugno et al.

(10) Patent No.: US 6,415,385 B1
(45) Date of Patent: *Jul. 2, 2002

(54) DIGITAL SIGNATURING METHOD AND SYSTEM FOR PACKAGING SPECIALIZED NATIVE FILES FOR OPEN NETWORK TRANSPORT AND FOR BURNING ONTO CD-ROM

(75) Inventors: Lauren Ann Cotugno, Dove Canyon; Thien Huu Pham, Garden Grove, both of CA (US)

(73) Assignee: Unisys Corporation, Blue Bell, PA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/124,557
(22) Filed: Jul. 29, 1998
(51) Int. Cl.$^7$ ................................................ H04L 9/32
(52) U.S. Cl. ...................................................... 713/176
(58) Field of Search ................................. 713/150, 168, 713/176, 179, 194, 187, 167, 180; 710/68, 74

(56) References Cited

U.S. PATENT DOCUMENTS

| | | | | |
|---|---|---|---|---|
| 5,675,780 A | * | 10/1997 | Plant-Mason et al. | 707/6 |
| 5,745,678 A | * | 4/1998 | Herzberg et al. | 713/200 |
| 5,870,756 A | * | 2/1999 | Nakata et al. | 707/200 |
| 6,021,491 A | * | 2/2000 | Renaud | 713/179 |

FOREIGN PATENT DOCUMENTS

| | | | |
|---|---|---|---|
| WO | WO 99/38093 | * | 7/1999 |

* cited by examiner

*Primary Examiner*—Matthew Smithers
(74) *Attorney, Agent, or Firm*—Alfred W. Kozak; Mark T. Starr; Lise A. Rode

(57) ABSTRACT

A specialized data format native to a first platform is wrap-packaged into an industry-standard text file in a protocol suitable for Internet transmittal. A Signature Support Library provides parameters to combine with a User's private key to generate a signature particular to the data file being converted.

12 Claims, 14 Drawing Sheets

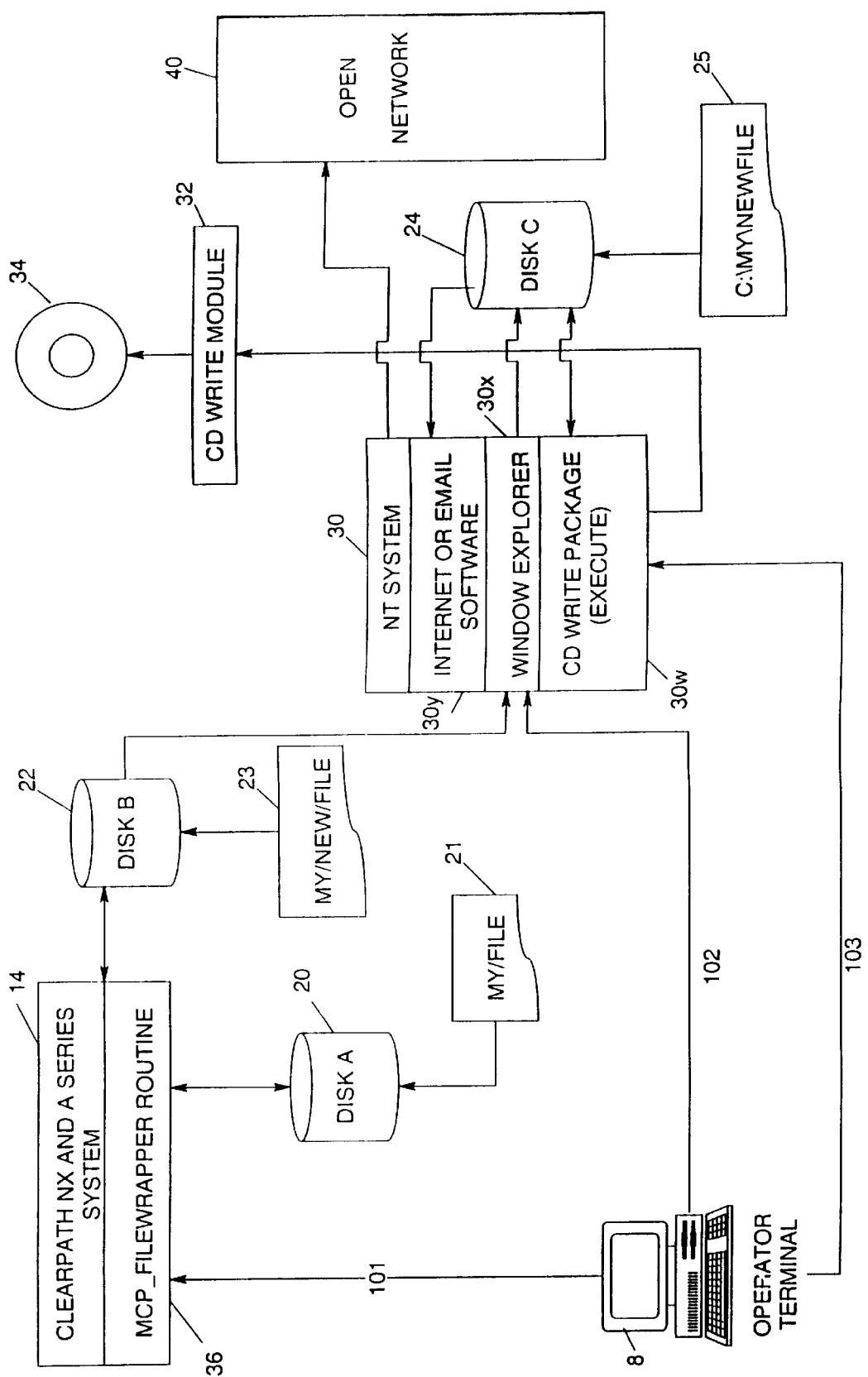
FIG. 1A - OVERVIEW OF DIGITAL SIGNATURING AND WRAPPING SINGLE FILE

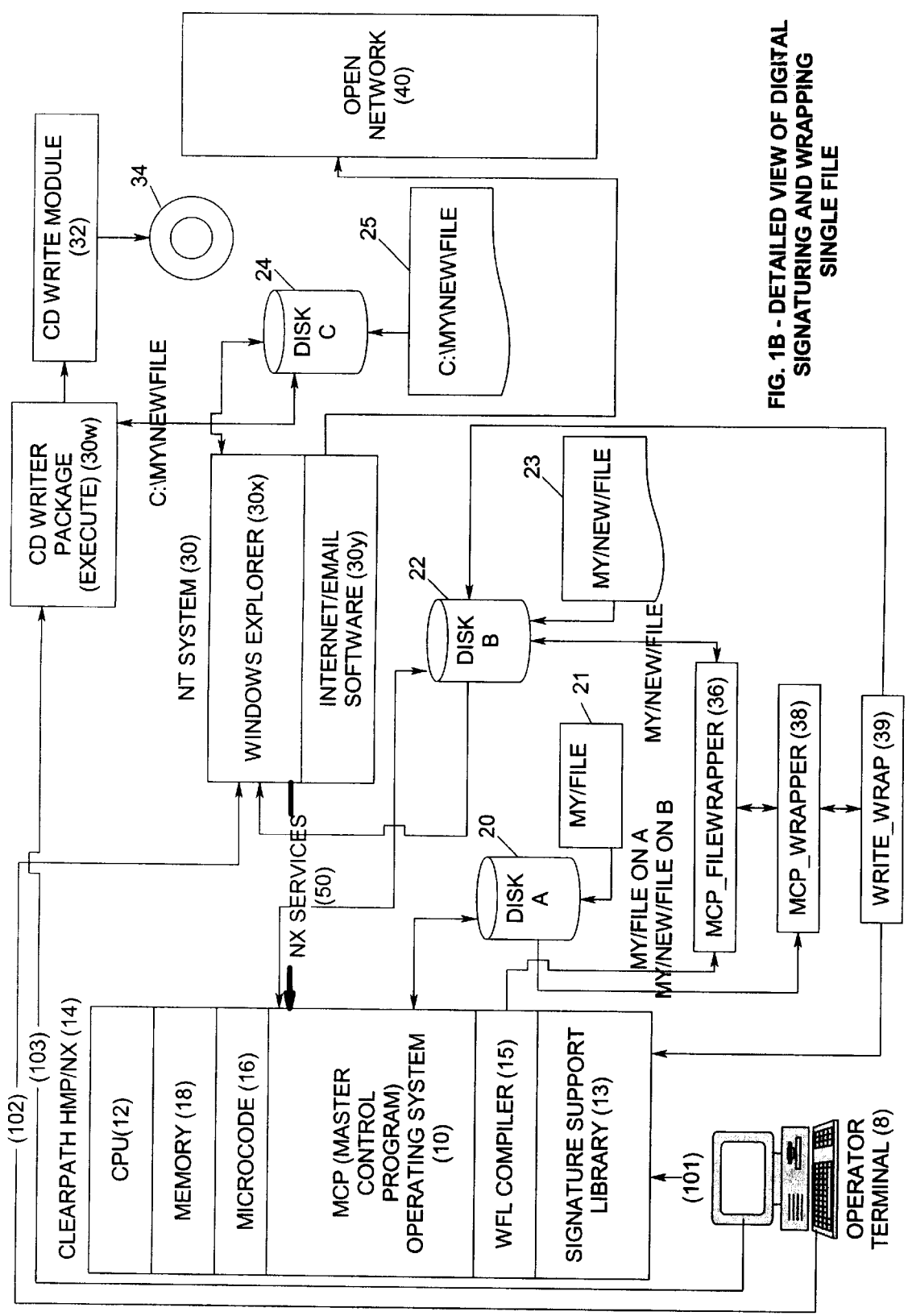
FIG. 1B - DETAILED VIEW OF DIGITAL SIGNATURING AND WRAPPING SINGLE FILE

| (i) | (ii) | (iii) | (iv) | (v) | (vi) DIGITAL SIGNATURE | |
|---|---|---|---|---|---|---|
| "UNISYS000010" | <OPTIONS> | THE A SERIES DISK FILE HEADER +HEADER CHECKSUM | <THE FILE> | <CHECKSUM> | R | S |

*FIG. 3*

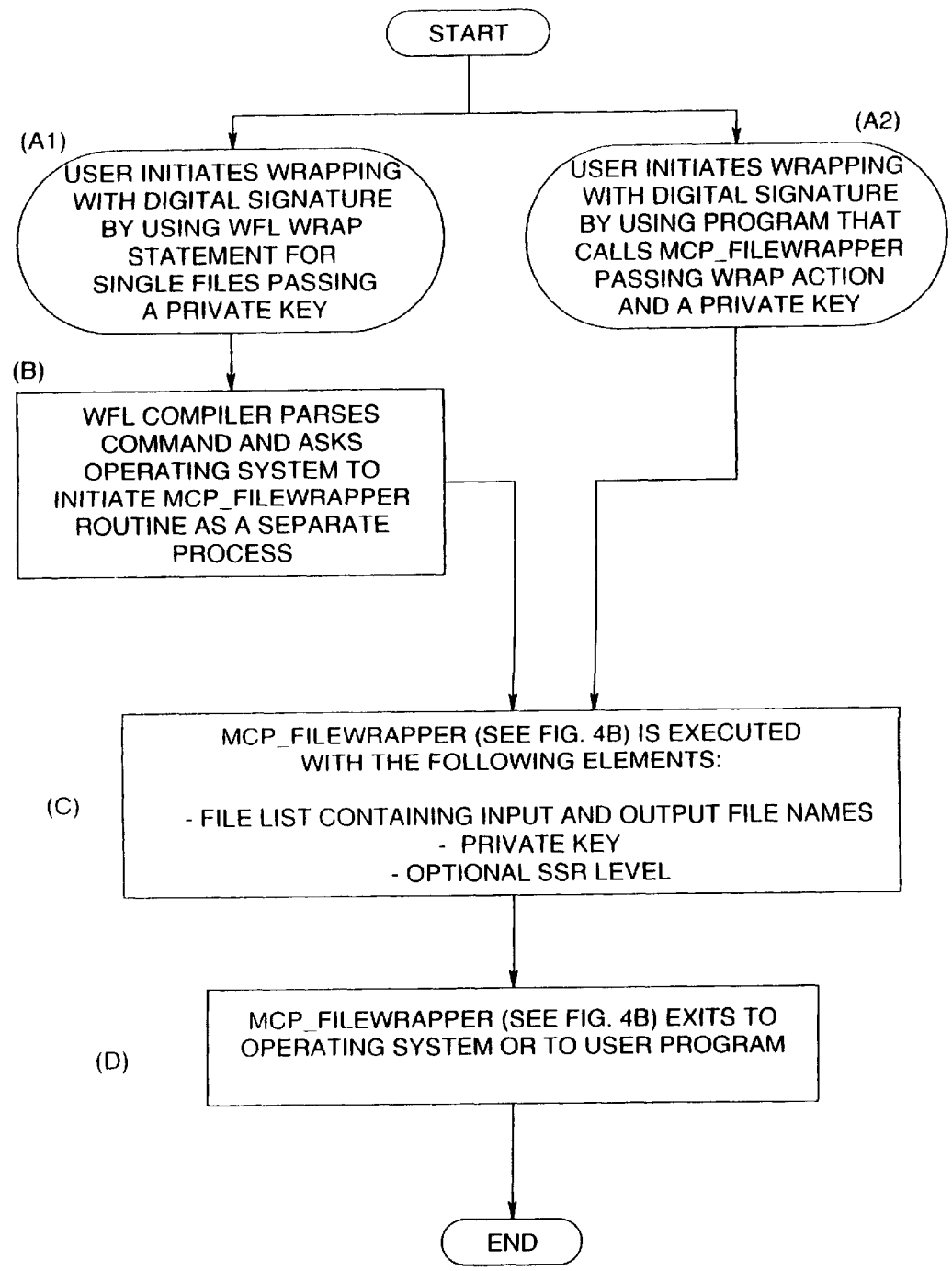
FIGURE 4A: THE OVERALL PROCESS OF SIGNING AND WRAPPING SINGLE FILES

MCP_FILEWRAPPER
LOGIC TO DIGITALLY SIGN
AND WRAP SINGLE FILES

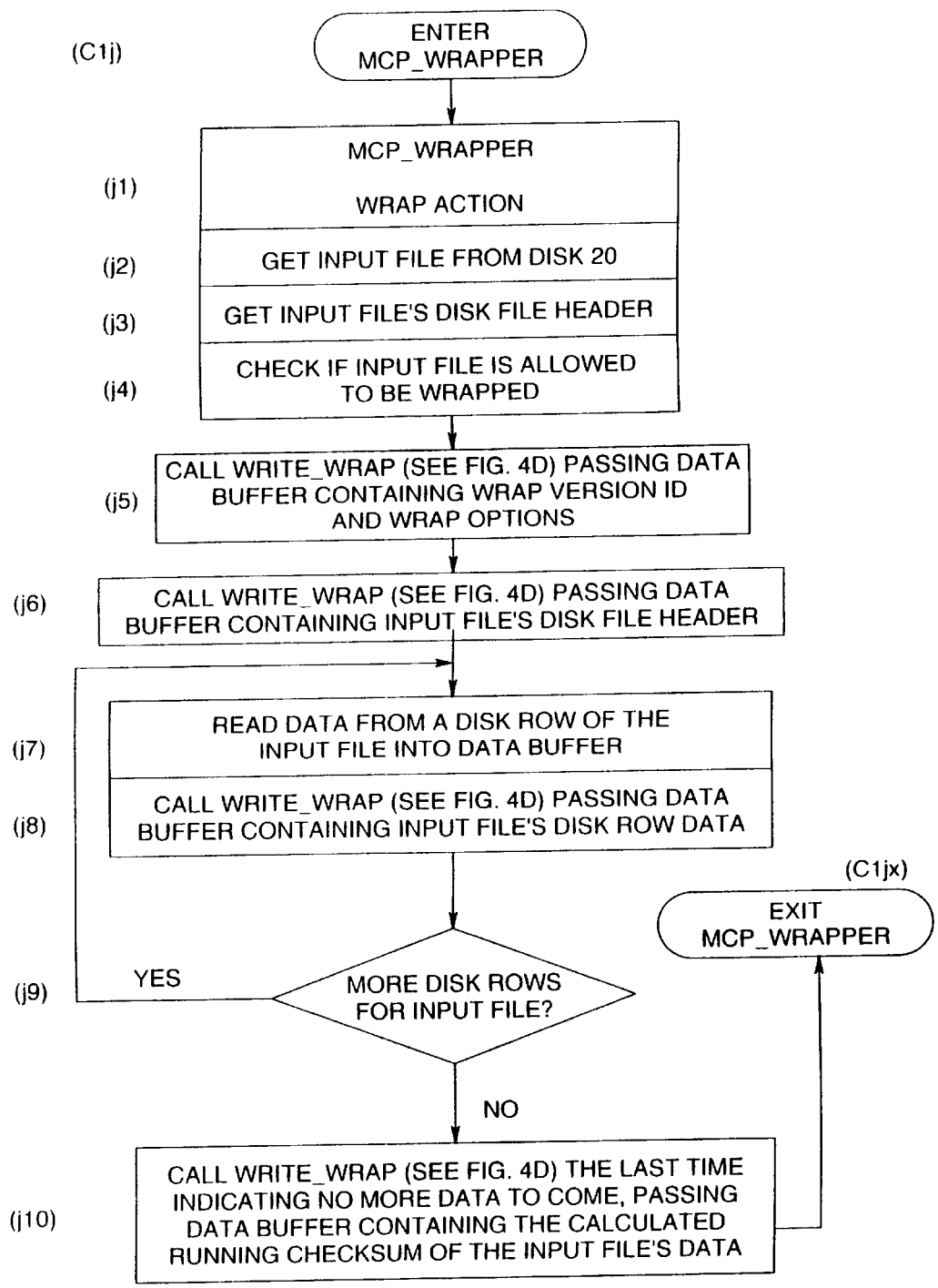
FIGURE 4C: MCP_WRAPPER LOGIC TO DIGITALLY SIGN AND WRAP SINGLE FILES

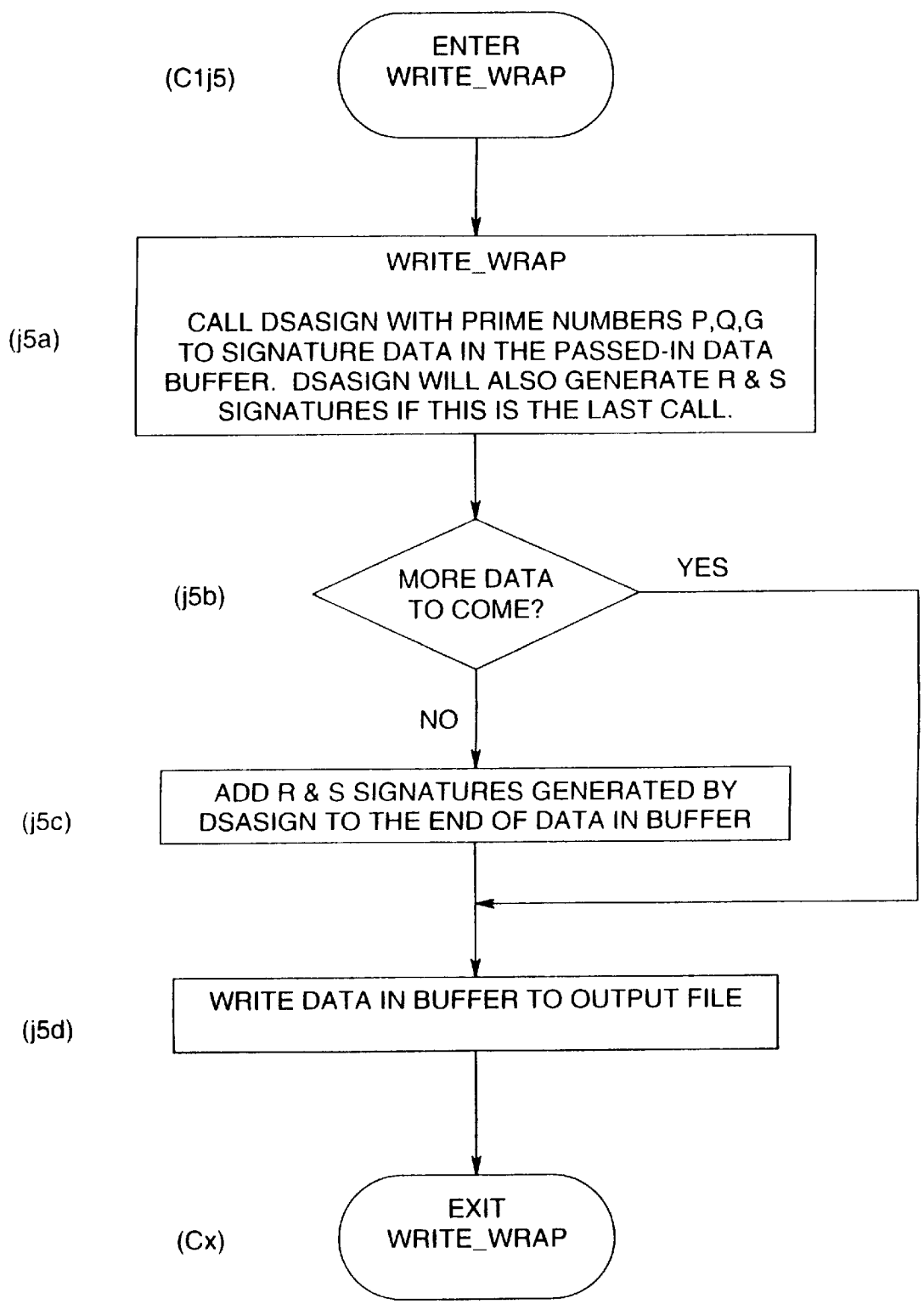
FIGURE 4D: WRITE_WRAP LOGIC
TO DIGITALLY SIGN AND WRAP SINGLE FILE

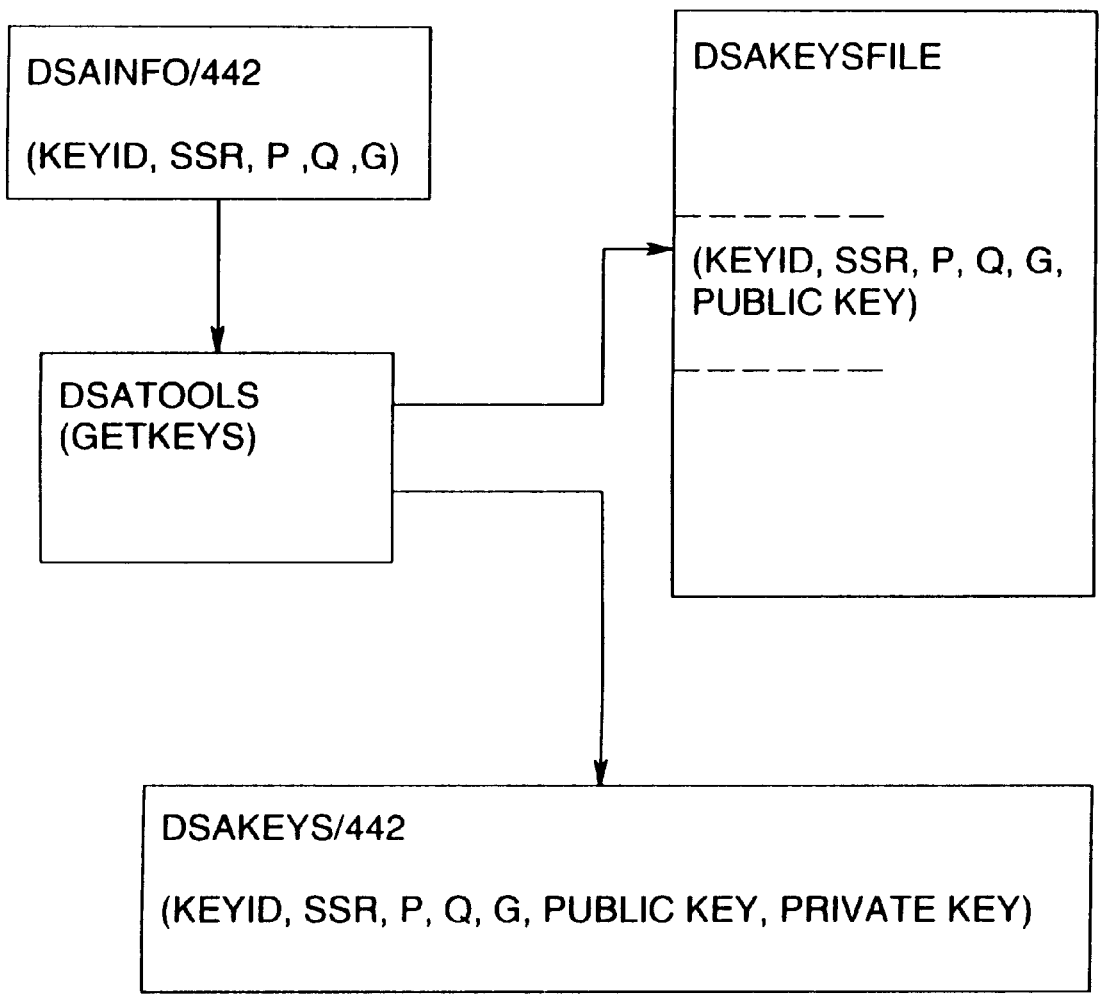
FIGURE 5: - CREATING A DSA KEYSFILE

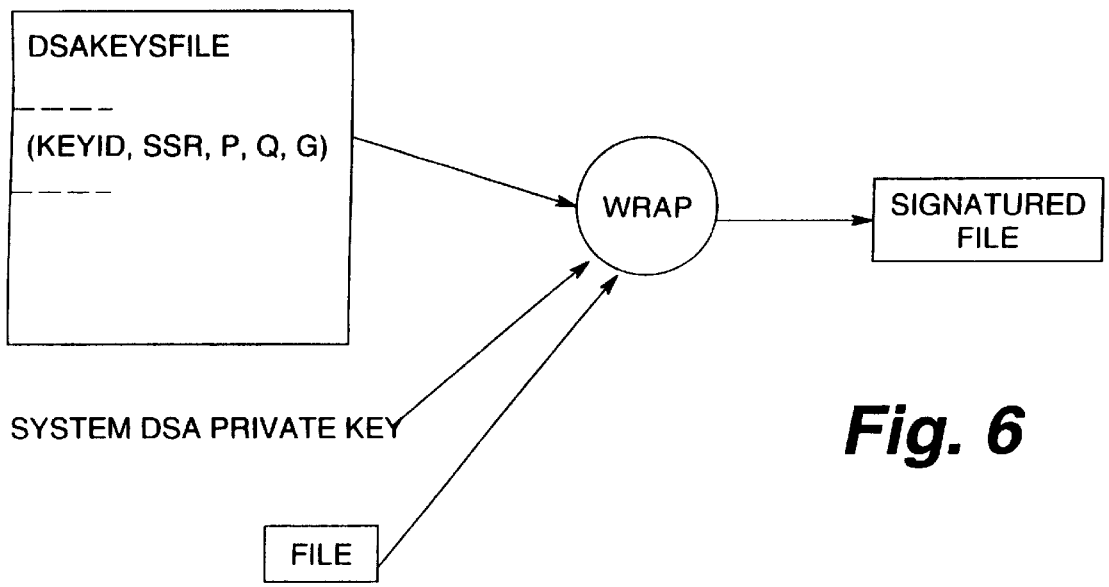
FIGURE 6: - WRAP AND SIGNATURE A FILE
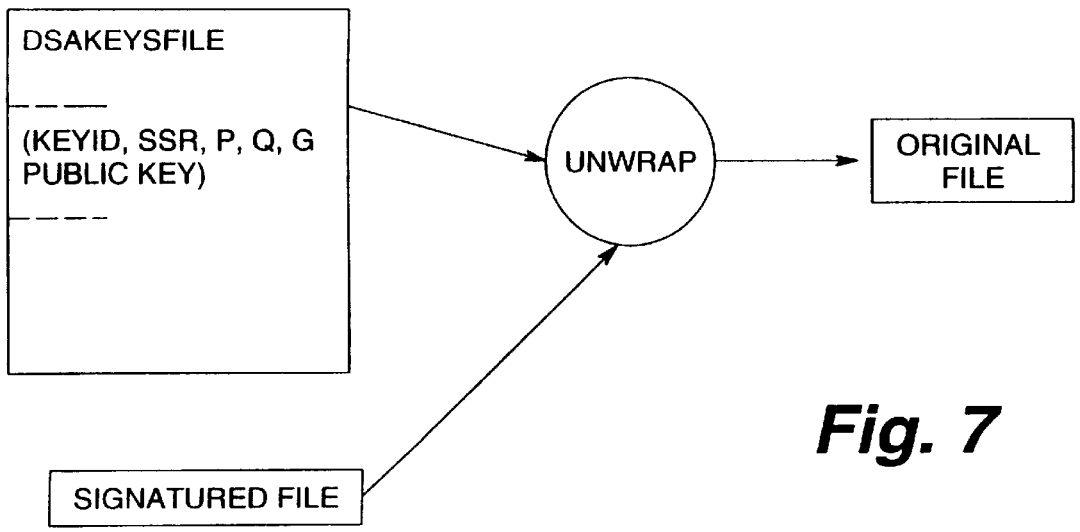
FIGURE 7: - VERIFY AND UWRAP A SIGNATURED FILE

DIGITAL SIGNATURING METHOD AND SYSTEM FOR PACKAGING SPECIALIZED NATIVE FILES FOR OPEN NETWORK TRANSPORT AND FOR BURNING ONTO CD-ROM

CROSS-REFERENCES TO RELATED APPLICATIONS

This application is related to a application U.S. Ser. No. 08/962,468 entitled "Method and System for Wrapping Single Files for Burning into Compact Disk" which issued as U.S. Pat. No. 5,983,295 on Nov. 9, 1999.

FIELD OF THE INVENTION

This system relates to methods for enabling and signaturing data files which are organized in a first native format to be packaged (wrapped) and burned onto a Compact Disk and to enable the packaged files to be transported via standard protocols and utilized outside their native environment in networks utilizing different data formats.

BACKGROUND OF THE INVENTION

In the usage of modern computer systems and networks, the situation arises where systems having one proprietary protocol and data format are connected to systems having different data formats and protocols. Thus in order to provide for systems integration in different networks, it is necessary that there be provided a system or method whereby the data formats of a first system can be transferred to and utilized by the network of a differently oriented system.

For example, the Unisys A Series computer systems involve a Central Processing Unit and memory together with storage such as disk storage which operates under the control of a Master Control Program. These A Series systems use a particular format for the data files compatible with the A Series software which can be placed on CD-ROMs. Thus, the CD-ROMs which contain this A Series software contain an image of a formatted tape which can be utilized only by the A Series systems.

However, when it is desirable to integrate a first system such as the A Series systems for operation with other platforms such as an NT system, then problems arise in that the second system such as the NT system, utilizes formats which are not compatible with the software formats of the A Series system, which is the first system.

Presently, the software for a first system, such as an A Series system with software, is utilized by providing methods to burn CD disks from a Library Maintenance formatted tape. This method has the limitation in that it limits the type of files that are burned into CD-ROMs to those of the native A Series files.

Now, in order to provide for system integration where an A Series system is to be coupled to a NT system, which overall system would be designated as a Unisys ClearPath system, the desirability here would be to make and use a single CD-ROM disk which would carry both the A series software and at the same time carry the NT software.

Thus in this regard, a method is needed to couple the A Series files with their native attributes and also arrange them in a format capable of being stored on a particular media such as a CD-ROM which will also hold the readable software for the NT system.

The same system or method also provides the ability to package files of a proprietary system in such a way that allows the files to be transported across an open (non-proprietary) network without losing their original characteristics. When such files return to their native environment, their true data formats can be restored.

For example, the A Series systems have files with specialized attributes such as FILEKIND, CREATIONDATE, RELEASEID, etc. When these files are transferred to a PC running Windows NT, all those attributes will be lost. By packaging the files and their attributes into standard, simple text files, the new files then can be transported across any open system (e.g., UNIX, NT). Upon reaching their destinations (which are other A Series systems), the text files are converted back to their native forms with all the right attributes. This is ideal for maintaining A Series data formats in a heterogeneous networking environment.

A digital signature is calculated for every file as it is being WRAPPED (packaged). This signature is calculated using the Disk File Header (DFH) and the data within the file, along with the Public/Private key pair. This will ensure that there is no intentional corruption of the Disk File Header (DFH) and the data as the file is shipped across a network. It will also provide the receiver of the file a certain measure of confidence as to the origin of the file. Additionally to the signature, there will be calculated a checksum for entire contents of the file, including the Disk File Header.

When a file is wrapped with a request for digital signature, its Disk File Header will have a checksum, its entire file will also have another checksum, and a digital signature will be calculated for the entire contents of the newly wrapped file. The functionality of wrapping files with digital signature is available through the WFL syntax as well as through a programmatic interface.

As a result, the Unisys A Series systems will provide a programmatic interface to its Master Control Program (MCP) which will provide a mechanism for "wrapping" files with signature and for "unwrapping" signatured wrapped files.

Wrapping is a term which is used to define the process of packaging an A Series file, along with its Disk File Header information and a checksum and optionally a digital signature, as a byte-stream data file, so that it can be transported across heterogeneous networks and non-A Series specific media, while still maintaining its native A Series attributes.

Unwrapping is a term used to define the process of taking a previously "wrapped file" and coupling it with the information from its original Disk File Header (DFH) in order to restore the original native A Series file, as it existed prior to being wrapped.

Thus, the problem of a software and file format which is oriented to one specialized system can now be transformed in order to provide a format that is utilizable not just for a first system, but also for a first and second system, whereby the second system would not ordinarily be compatible with the first system. Thus, it is desirable to allow files (created on a Unisys ClearPath HMP/NX system or A-Series system) to be transformed so they can travel across a completely different system (such as NT) without loss of the file's original native characteristics.

The presently described system and method provides for taking a first file format with native attributes such as used in Unisys A-Series systems and developing a second generalized format for transport to an open network without losing the native attributes and for burning into a CD-ROM such that now this second file format is compatible for both NT and other systems in addition to A Series systems.

The second file format will provide a signature to be created for the entire file. This is so, since the checksum is not sufficient to ensure that a Disk File Header has not been intentionally corrupted, since the checksum algorithm is not protected, and could easily be reproduced. A signed, wrapped file can be sent to another user through e-mail, through the Internet or put into an industry-standard CD-ROM.

Thus, the packaged (wrapped) file can be transported to an open network without loss of the native attributes and can be burned onto an industry-standard CD-ROM without loss of native attributes. In each case, a digital signature is generated to ensure the integrity of the packaged file.

SUMMARY OF INVENTION

An algorithmic sequence is implemented in software for transforming files of a proprietary system into single wrapped files with digital signature option. The new files are stored in a standard text file format such that they can be transported to and across an open network while still maintaining their native characteristics. They can also be burnt together with files originated from other platforms onto the same industry-standard Compact Discs (CDROMs) which then can be viewed and utilized by a variety of systems.

The present system is applicable in the Unisys ClearPath environment which involves a situation where two systems are connected to and communicating with each other, for example, such as that a Microsoft NT platform and a Unisys A Series platform can both read from the same Compact Disc in a compatible fashion. Thus, this makes it possible to put the NT platform software and the A Series platform software all on the same CD-ROM.

The present system is also applicable in a heterogeneous networking environment where one Unisys A Series system needs to transport its native files across computers of different platforms (for example, UNIX, Windows NT) to another Unisys A Series system. The method enables native files to be encoded in such a way that they can be treated as simple text files by any computing platform and to be restored back to their original forms by an A Series machine without losing their native attributes.

For security and data integrity reasons, the Master Control Program of the A Series computer generally cannot trust files, particularly code files that come from external sources. Thus, the method creates a digital signature for a wrapped file to ensure that the file is not tampered either intentionally or unintentionally during its transit.

BRIEF DESCRIPTION OF THE DRAWINGS

FIG. 1A is a general overview of the present system for digital signaturing and developing a transportable file;

FIG. 1B is a more detailed block diagram of the system which enables digital signaturing, the packaging of a transportable file and burning-in of a Compact Disk with a file which is compatible to both a first protocol system and a second protocol system;

FIG. 4A is a flow chart illustrating the overall process of signaturing and wrapping single files;

FIG. 4C is a flow chart illustrating the MCP_WRAPPER logic to digitally sign and wrap single files;

FIG. 4D is a flow chart illustrating the WRITE_WRAP logic to digitally signature and wrap a single file;

FIG. 5 is a block diagram to show creating a DSAKEYSFILE;

FIG. 6 is a block diagram to show how to wrap and signature a file;

FIG. 7 is a block diagram to show how to verify and unwrap a signatured file.

GLOSSARY ITEMS

Figures 1, 2A:
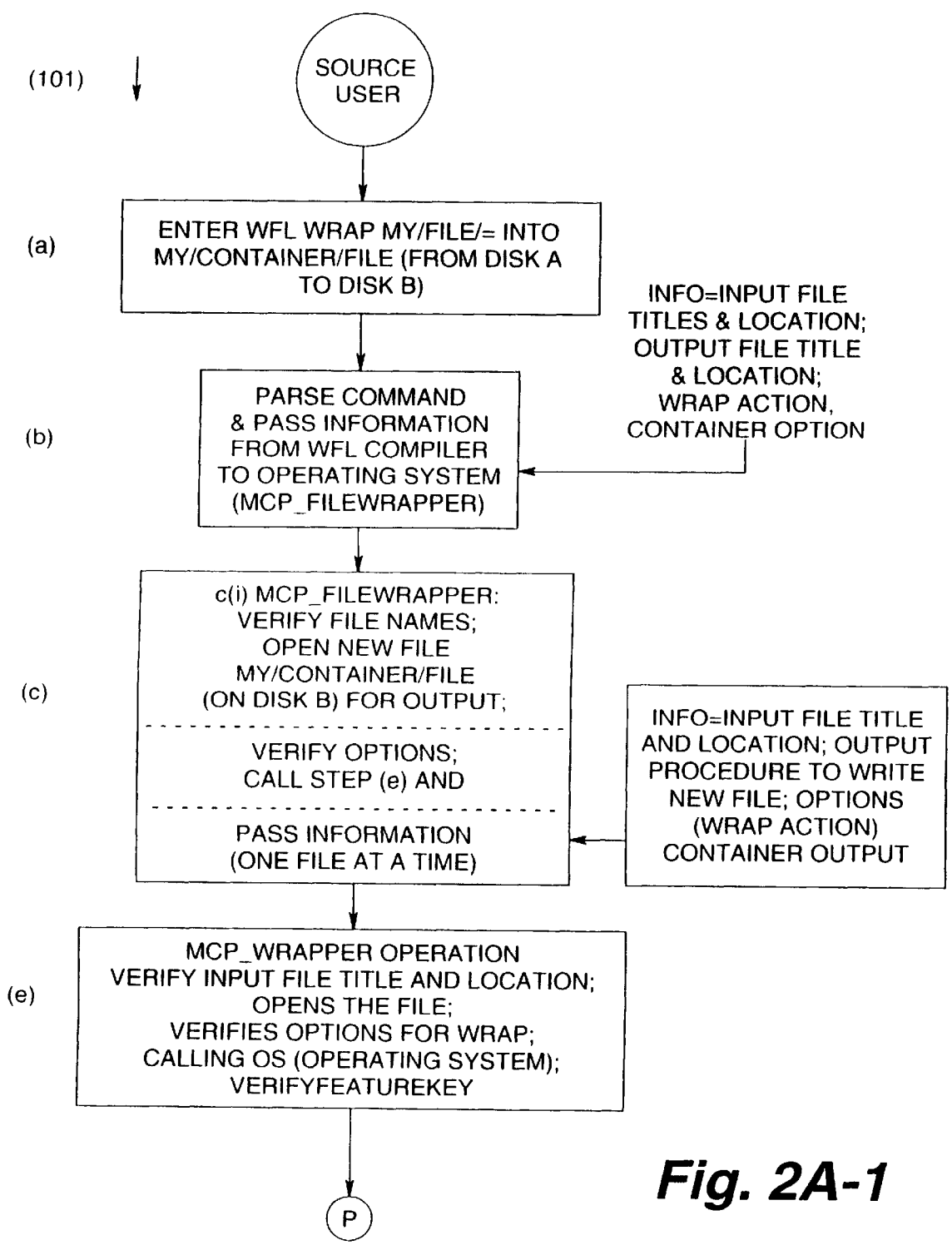
FIGS. 2A (-1, -2, -3, -4) and 2B are flow charts indicating the system of steps involved for burning a CD-ROM with the data in a generalized protocol format suitable for Internet transmission and for compatibility with NT or other platforms.

1. A SERIES ATTRIBUTES: Native attributes that can be assigned to a file to allow the system to control how the file is accessed and used, and by whom (security privileges). There are somewhere on the order of 450 such attributes for Unisys A Series files.
2. A SERIES KEYS FILE: A native file, located on a individual system, that contains license key information used to control which features an individual system is allowed to use for some features. License keys need to be purchased by the user before the feature can be utilized on the individual system.
3. ATTRIBUTE INFORMATION OF A SERIES FILES: Specific attributes assigned to individual files stored in the file's Disk File Header (DFH) on Disk.
4. BYTE-STREAM FILE: A character oriented file with FILESTRUCTURE=STREAM, MAXRECSIZE=1, AND FRAMESIZE=8. This is a simple, non-executable, data file that can exist on any kind of system.
5. DATA CD-ROM: See ISO 9660 Format (Item 12 below). These CD's appear like disks on A Series systems. Multiple user access is allowed to these CDs.
6. DIGITAL SIGNATURE: A digital signature is a hash pattern created by applying an industry standard signaturing algorithm (similar to a checksum) to a file or data stream, along with a private key. This hash pattern travels with the file across a network and is used, along with a public key, in order to ensure the file has not been compromised (intentionally or otherwise) during the transfer process.
7. CONTAINER: A single byte-stream file consisting of one or more wrapped files, a simple directory of files stored in the container, and optionally a digital signature.
8. CREATIONDATE: An A Series (Unisys) file attribute, used to store the data and time a file was created.
9. FILEDATA—LFILE: An A Series (Unisys) program, or utility, used to interrogate attribute information of native A Series files.
10. FILEKIND: An A Series (Unisys) file attribute, used to identify the internal structure of the file being accessed (e.g. Algol symbol, Algol object code, character data, or system directory).
11. INTERIM CORRECTION PROCESS (ICP): The process used by Unisys computer systems to deliver software updates to released products held by customers.
12. ISO 9660 FORMAT (A.K.A. ISO STANDARD FORMAT, HIGH SIERRA FORMAT): A standard format used for directories and files on CD-ROM disks. The presentation for the information contained on these directories is at the operating system's discretion. On Unisys A Series systems, directories and files are viewed using the standard Cande "FILES" and ODT "PD" commands.

13. LIBRARY MAINTENANCE FORMAT: A Unisys proprietary format for tapes containing multiple files used primarily for archives, backup of restore, and transferring of files among A Series systems.
14. LIBMAINT CD-ROM: A specially formatted CD-ROM, created on an ISO 9660 Formatted CD-ROM, that contains an image of a Library Maintenance tape. This appears to an A Series system as if it were a Library Maintenance tape. Only one user is permitted access at a time, and only COPY (and COPY-related) syntax, and Filedata TDIR are allowed to act on this CD.
15. NATIVE A SERIES FILES: A file created on Unisys A Series systems or ClearPath HMP/NX systems specifically for use on that same class of systems.
16. NON A SERIES FILES: Files that were created on systems other than Unisys A Series or ClearPath HMP/NX systems.
17. NEW FORMAT FILE: the Byte-Stream data file that results from executing the WRAP process on an A Series file.
18. NT SOFTWARE—CD BURN PROCESS: Any standard "Off-the-shelf" package capable of burning images on to a Compact Disk (CD) that runs on a Microsoft NT system.
19. P, O, G, keys: Primary numbers, stored in the system's digital signature keys file and used in the creation of public/private keys as well as both signing files and verifying the signatures of files, using the public and private keys.
20. PUBLIC & PRIVATE KEYS: Public and private key pairs are generated at the same time by a special utility. These key pairs are used to create a signature and then later check that signature to ensure that a file has not been compromised. These keys are generated together and must be used together to ensure the integrity of a file. Under normal operations, the private key is intended to be known only by the person or utility generating the hashed signature of the file. This key is meant to be restricted. The public key can be made available to any person or utility wishing to check the signature to ensure the integrity of the file once it has reached its destination.
21. PUBLIC/PRIVATE ENCRYPTION: A common methodology for encrypting files so they may be transported across an open network so as to use a public/private password encryption scheme. Typically, the two passwords are programmatically generated at the same time such that they can be used in conjunction with each other. One password, the private one, will be used to encrypt the file. The other password, the public one, is used by the recipient of the file to decode it. Typically, a smear pattern, or some clear text string, is added at the beginning of the file before the file is encrypted. When the file has been decoded using the public password, this smear pattern should match what was originally placed in the file. If the string does not match, it can be assumed that the integrity of the file has been compromised.
22. RELEASE ID: A Unisys A Series file attribute, used to store the specific release level that the software was created for.
23. SHARE: A Directory or disk that is made available to selected or all users across a network.
24. UNWRAP: The process of taking a previously wrapped file (or data stream) and coupling it with the information from its original Disk File Header, to re-create the original native A Series file as it existed prior to being wrapped.
25. WFL SYNTAX: Work flow language syntax, used to control job flow on a system.
26. WFL UNWRAP syntax: Specific work flow language syntax used to execute the unwrap process on a file, or files.
27. WRAP: The process of packaging an A Series file, along with its Disk File Header information and a digital signature, as a data stream, or as a byte-stream data file (FILESTRUCTURE=STREAM, MAXRECSIZE=1, FRAMESIZE=8), so that it can be transported across heterogeneous networks and non-A Series specific media, while still maintaining its native A Series attributes.
28. INPUT FILE: The already existing file that is to be packaged into a byte-stream text file by the wrap process.
29. OUTPUT FILE: The resultant byte-stream text file created by "wrapping" the input file.
30. DSA: Digital Signature Algorithm—used to create a digital signature for a file or data stream. It should not be confused with any data encryption algorithm since the data is not encrypted by any means.
31. DSA INFORMATION SET: This term is used loosely here. It is essentially the same as DSA Key Set, but without the system DSA public key.
32. DSA KEY SET: A set of DSA information which consists of {KeyID, SSR level, Prime P, Prime Q,G, system DSA public key} for a particular software level. Only one set is created for a software release.
33. DSA KEYSFILE: The system file that contains one or more DSA key sets. If the file is titled as *SYSTEM/DSAKEYSFILE and is stored on the halt/load pack, it is considered as the active system DSA keysfile.
34. SIGNATURING: The process of applying the Digital Signature Algorithm to a file while wrapping it into a WRAPPEDDATA or CONTAINERDATA file. The resulting file is said to be digitally "signatured" or "signed".
35. SYSTEM DSA PRIVATE KEY: A DSA private key created for the sole purpose of signaturing Unisys-released software. It is kept secret by the Unisys Software Releases (and/or Support Group). Only one system private key exists per release. Its counterpart—the system public key—is stored in the system DSA keysfile.
36. SYSTEM DSA PUBLIC KEY: A DSA public key created for the sole purpose of verifying wrapped software signed by the Unisys Software Releases (and/or Support Group) using a corresponding system DSA private key. Only one system public key exists per release and is stored as part of a DSA key set in the system DSA keysfile.
37. VERIFYING: The process of validating the digital signature of a WRAPPEDDATA or CONTAINERDATA file before unwrapping it.
38. WRAPPED FILES: Files created as a result of the wrapping process—See Wrapping.
39. SL (SYSTEM LIBRARY): SL is a Unisys A-Series MCP systems operation used to declare that a codefile or program, is to be considered a "System Library" for execution purposes. It allows for other programs to access the functions in that library without knowing much of anything about the library itself. The operating system will have knowledge about where the library is located on the disk, and control over which programs are allowed to link to the library for the purpose of accessing its routines.

GENERAL OVERVIEW

As seen in FIG. 1A, a user terminal 8 is connected to a first operating system 14, such as a Unisys A Series computer, having outputs to a disk A,20 and a disk B,22.

A second operating system, such as NT platform system 30, utilizing the Microsoft Explorer program 30x, Internet or e-mail program 30y, and a CD Writer Package 30w, communicates with disk C,24 so that the User terminal 8 can initiate the CD Writer Package 30w to energize the CD Write Module 32 in order to burn a file on to the compact disk (CD) 34.

The disk A,20 holds data designated as MY/FILE. The disk B,22 holds the data designated MY/NEW/FILE,23. The disk C,24 holds the resultant data designated C:MY\NEW\FILE,25. The data 25 of disk C,24, is controlled by the CD Writer 30w for transmittal to the CD Write Module 32 for burning into the compact disk (CD) disk 34. The Internet/e-mail programs 30y enable transmittal of a packaged file (wrapped) to the open network 40. It may also be noted that Disk A and Disk B could actually be the same physical device. It is not necessary that they always be two separate entities.

In summary, the User terminal 8 will use the channel marker cycle designated 101 to the first system computer 14 with a WFL WRAP [input file] as a [output file] from the [input disk media] such as disk A over to a [output disk media] such as disk B,22.

Then using channel marker cycle designated 102, the User terminal 8 will communicate with the NT system 30 having Microsoft Explorer 30x, in order to start an operation which drags the file from the A Series' disks A,20, and B,22, and drops the file on to the NT systems' disk C 24.

The User terminal 8 using the designated channel marker cycle 103 then executes the CD Writer Package 30w by initiating the CD Write Module 32 in order to burn the file 25, C:MY\NEW\FILE, on to the CD (compact disk) unit 34.

Finally at this time, the resultant file data on the compact disk 34 is in a protocol compatible for usage by other platforms.

In FIG. 1A, the second system designated as the NT system 30 could also be designated alternatively as a UNIX system, in which case, the NX services 50 shown in FIG. 1B would not be required and the Microsoft Explorer program 30x of FIG. 1A would be replaced by the industry-wide standard File Transfer Protocol (FTP).

FIG. 1B will be subsequently described herein to indicate the hardware system in greater detail.

DESCRIPTION OF PREFERRED EMBODIMENT

Referring to FIG. 1B, there is seen a drawing of the major elements involved in the present system.

A first system is shown, for example, such as a Unisys A Series computer operating system 14 which involves a Central Processing Unit 12, a main memory 18, a microcode memory 16 which is managed by the MCP 10 (Master Control Program). The CPU 12 is also supported by a storage media 20, Disk A, which carries an original file 21, designated MY/FILE which is formatted suitably for the first system such as the A Series computer system 14 and Disk B,22, which will be enabled to carry a new file designated MY/NEW/FILE, which is formatted for transport to a second system.

Now, in the sense of integrating to other systems, there is seen a second system called the "NT System 30" (alternatively a UNIX, IBM or other system) which is a platform developed by the Microsoft Corporation of Redland, Washington. The NT System 30 is seen having a storage medium 24 such as Disk C, which will eventually be provided with a resultant file 25 designated C:MY\NEW\FILE (Item 25).

The A-Series system 14 is provided with a WFL (Work Flow Language) compiler 15 which is an interpretive language capable of taking User instructions and translating them into Operating System (O.S.) procedure calls. The MCP 10 has a relationship to the NT system 30 through use of a NX services unit 50.

NX/Services is a software unit used to integrate MCP operations with NT platform operations through the use of a Microsoft (MS) Standard RPC (Remote Procedure Call) interface.

The WFL compiler 15 is an interpretive compiler which provides a new language syntax using the word "Wrap".

The Operator Terminal 8 of FIG. 1B, is the operator interface in which an operator would enter a command such as WRAP MY/FILE AS MY/NEW/FILE FROM A TO B, which is the file 21 sitting in Disk A and MY/NEW/FILE which is the file 23 (FIG. 1B) residing in Disk B. This command is transmitted through the MCP (or Master Control Program 10) in order to initiate the action of the WFL compiler program 15.

The MCP 10 then calls the MCP_FILEWRAPPER routine 36 passing parameters built by WFL 15 as the input to this routine. The MCP_FILEWRAPPER process 36 will then take the original MY/FILE 21 from Disk A, 20 and convert it to a new file designated MY/NEW/FILE 23 and deposit this into the storage disk B,22.

The MCP_FILEWRAPPER process 36 will call the NCP_WRAPPER 38 routine indicating that the data should be processed, wrapped, and signed.

Thus, the NCP_WRAPPER routine communicates back to Disk A and reads the file starting with the file's Disk File Header (DFH) information and then its rows of data. For each buffer it reads, MCP_WRAPPER calls the WRITE_WRAP routine 39 to calculate the running signature for the data, as well as write the data out to the temporary output file MY/NEW/FILE on Disk B.

When there are no more rows of data, the MCP_WRAPPER routine 38 calls WRITE_WRAP the last time passing the checksum on the contents of the whole file. The WRITE_WRAP routine 39 determines the final digital signature and then writes both the checksum and the signature to the output file MY/NEW/FILE on Disk B before returning to MCP_WRAPPER.

The MCP_WRAPPER routine returns to MCP_FILEWRAPPER and tells it to make the file MY/NEW/FILE on Disk B permanent. As a result, there is now a data file provided onto the storage Disk B,22. This file, MY/NEW/FILE, is now available to the NT system platform 30 from the file 23 residing on Disk B,22.

Another example of a problem that arises is the situation where there are two separate and different A Series computers, whereby the first computer has data and information (files) which it is desired to give or present for use by the second computer system. Normally, if the first system file is in object code, it is then necessary to put it on a tape and mail it to the second computer User or alternatively, to have the first system and second system connected to each other through a proprietary network connection. However, this is sometimes a long and cumbersome process, when it would be most desirable to be able to transmit it electronically to the second user through an open network such as e-mail or FTP (File Transfer Protocol).

Thus in the present system, the first computer system user would take his file and do his wrapping operation using either the Work Flow Language (WFL) statement WRAP or a user program that interfaces with the MCP routine MCP_FILEWRAPPER (or MCP_WRAPPER if no digital signature is required).

Thus, what has been accomplished is to take an original A Series file and repackage it, allowing the resultant file to be transported across an open network or to be burnt onto a PC-readable CD-ROM without losing the file's native attributes. When the file is loaded back to its native environment, it will be restored to its original state.

It should be noted that once the new file 23 has been placed on storage Disk B, 22, then by the use of the NX services 50, this new file 23 can be transmitted to the NT system 30. Thus, the NT system with its hard Disk C,24, can now receive and utilize the new file (as C:MY\NEW\FILE) which came from the storage Disk B,22.

Another problem aspect involved is when an operator wishes to take a file from a first system, such as an A Series system program and copy it into a UNIX box or an NT box—that information cannot normally be transported because of the format and protocol differences.

Thus, the specialized structure and format of the A Series native files which normally could not be moved across a network, would have to be reconstituted and stored as part of the data in the data file and then made into a regular character data file of a common format such that any operating system can read it. This would be a byte-stream data file which could be read by any platform, whether it be a UNIX box, an IBM box, or a NT box. Thus, resultantly there is now a file that any platform can read.

In what is called the "Unwrapping" operation, all the time-stamped dates are reapplied, all the disk, row, address information is supplied, the file is rewritten row for row, segment for segment, exactly as it looked on the original system. Thus, if there were "spaces" at the end of the segment on the original file, there will also be the same spaces at the end of this segment on the resultant file. This is so because all this information is in the file's Disk File Header.

Thus, what has been accomplished is to take a first original native file and repackage it, by burning the file into a CD-ROM, so it can be transported anywhere to a second location, and then be loaded to act like the original file.

One method of getting system software out from the originator to a customer is on a Compact Disk, that is a CD-ROM, which has specially formatted arrangements in order to transmit A Series software. However, these files often are not always an industry standard format.

Customers often ask saying that they have a Compact Disk writer on their PC and they want to know—"how do I format a file so that I can distribute software to my other terminals" or to other customers that they have in their area?

Thus, the present system allows these recipients to download these files to their personal computer and then burn them into a Compact Disk and send them to their local co-workers or to their other customers. The burned-in files on the Compact Disk are burned using Industry Standard format for compatibility to other systems platforms, such as NT system platforms, UNIX system platforms, IBM system platforms, DEC System platforms and Unisys A Series system platforms.

Thus, the present system operates such that operators using the A Series systems can unwrap their files directly from an industry compatible Compact Disk, so that the file is usable just by putting the Compact Disk into the A Series system and giving it the command to "Unwrap Files". The files and software can then be received for utilization.

The present system requires the packaging of native files of a first computer system such as a Unisys A Series system, in such a way as to allow them to co-exist on the same CD-ROM media, as non-native files. This packaging of files also allows for the transport of the native (A Series) files across heterogeneous networks, while still maintaining information on their native (A Series) attributes.

Previously CD-ROM's contained native A Series software on CD disks which were burned from a library maintenance formatted tape. However, this limited these types of files to only be useful for native A Series systems which are formatted for native A Series files. The present system provides an expanded ability for burning the native A Series files of software for a first computer system. onto CD-ROM disks which will be compatible with suitable files for a second computer system, such as a Microsoft NT system and other platforms.

The native formatting of A Series files had attributes such as FILEKIND, CREATIONDATE, and RELEASEID, which now need to be placed in a format capable of being stored on a disk media which is using an industry-standard file format.

As mentioned earlier, "Wrapping" is a term used to define the process of packaging a native A Series file (first computer system) along with its Disk File Header information, (plus either a checksum, or optionally a digital signature), as a byte-stream data file (FILESTRUCTURE=STREAM, MAXRECSIZE=1, FRAMESIZE=8) so that it can be transported across heterogeneous networks and non-A Series specific media, while still maintaining its native A Series attributes.

The "digital signature" is created using an industry-standard public key/private key signaturing algorithm which provides a measure of security in that it allows a user confidence as to where the file originated from. The present system encompasses the Master Control Program (MCP), the Work Flow Language (WFL) program, and the FILE-DATA work necessary to wrap files by packaging them into new, byte-stream files (wrapping) and later restoring them to their original native A Series format when needed for A Series systems (Unwrapping).

New WFL Syntax

This involves a new work flow language syntax, so that arrangements are made in the WFL compiler 15 to support the new syntax which will have some similarity to a previous Library Maintenance MOVE command. The new syntax allows a User to wrap either a single file, a list of files, or a directory of files, in addition to subsequently enabling the unwrapping of these files, by specifying both the input file and the output file, or the directory title and location.

Added Programmatic Interfaces

A programmatic interface is provided that will allow the User-Caller to pass a native A Series file's title and location as "input" along with an "output" file, title and location. The "output" file will be a "byte-stream" file with a beginning data block containing (i) an identification string; (ii) the original files Disk File Header information; (iii) the file itself as byte-stream data; and (iv) an ending block containing a checksum, and optionally a digital signature.

Thus, the added programmatic interface allows the caller to pass byte-stream file's title and location as input, along with an output file title and location if needed, for use of the "unwrapping" process. The "resultant file" will be a native A Series file created with the output file and location, but also containing the data and all of the native A Series attributes of the original file.

Single Procedure Call

This first programmatic interface will allow input and output directory names to be passed in order to wrap or unwrap a directory of files with a single procedural call. This also allows for a single output "container file" to be created from multiple input files.

Second Programmatic Interface

This interface is created to allow a caller to pass the A Series file's title and location as "input", together with an "output" procedure. The data returned to the caller's output procedure will be a stream of data with (i) a beginning data block containing an identification string; (ii) the original file's Disk File Header information; (iii) the file itself as byte-stream data; and (iv) an ending block containing a checksum or a digital signature.

Functionally, the second programmatic interface will also allow the caller to pass an input procedure, along with the title and location of an output file. The data passed to the input procedure here would consist of a stream of data, with a beginning data block containing the identification string, the original file's Disk File Header (DFH) information, the file itself as "byte-stream data", and also an ending block containing the checksum and optionally the digital signature, which is basically the same information that was passed to the output procedure when the file was originally wrapped. Here, the "resultant file" will be a native A Series file created with the output file title and location, but containing the data and all of the native A Series attributes of the original file.

New FILEDATA Syntax

New syntax has been added to the FILEDATA LFILEs command in order to specify that the file being interrogated is a WRAPPEDDATA file. If this is a WRAPPEDDATA file, then FILEDATA will report the "attributes" of the native A Series file contained within the wrapped data file, rather than the attributes of the "wrapped" data file itself.

WFL Wrap Command

This is the Work Flow Language wrap command usable in a first system computer such as the Unisys A Series computer system which can be executed to initiate the action of taking specialized formatted native A Series files and turning them into byte-stream files which can later be burned onto CD-ROM disks. Thus, the software files of a first computer platform, such as the Unisys A Series system, can now be made able to co-exist on the same data CD-ROM's as other types of software which is not A Series software.

KEYSFILES

The system will provide the use of A Series KEYSFILE which will also be wrapped using the new WFL syntax. This resulting file will also be burned onto the CD-ROM. Normally, the Unisys A Series KEYSFILES are shipped on separate tapes from the rest of the software releases, so that in the present situation, the newly wrapped KEYSFILE will be shipped on a separate data CD-ROM separate from the rest of the A Series release software files.

The A Series KEYSFILE is a file on each A Series system used to store License Key information for the individual system in order to determine which of the Unisys licensed features the user has purchased for use on that system.

The new WFL UNWRAP syntax can be used to unwrap the KEYSFILE off of the CD, while copying it into the A Series system. Once the file (as KEYSFILE) has been copied onto the A Series system, then a IK MERGE can be performed. IK MERGE is the system command used to merge the data from the new KEYSFILE (unwrapped from the CD ROM on to Disk) on the A Series system into the system's current KEYSFILE.

Digital Signature Algorithm

The acronym DSA refers to the digital signal algorithm (DSA). The DSA public and private key are a function of a large prime numbers designated P,Q,G, which are generated by the digital signature algorithm. When "signing" a given file, the DSA requires the values of P,Q,G, and their private key to produce a digital signature which consists of two large integers designated R and S. When this message is to be verified, the verification process asks for a set of data designated [P,Q,G, PUBLICKEY, R, S].

A user is only concerned with the public and the private key pair. However, since prime numbers P,Q,G,R,S, are inherent and required in the creation and verification of a "digital signature", there must be provided a way to manage them and make their presence essentially transparent to the user. R and S are easy to handle because they are created during the "signing" process of a WRAP operation, so that their values are readily available to be embedded in the WRAPPED file. The handling of elements P,Q,G, on the other hand, is more complex because their values must be supplied from an "external source", (that is to say, the user), to the WRAPPING function.

Thus questions and decisions arise regarding (i) how should P,Q,G, be generated? (ii) Since the generation process consumes so much resources, how often should P,Q,G, be generated, that is to say, should it be on a per-run basis, on a per-user basis, or otherwise? (iii) Since each binary value occupies an array of 11 words, how would a user handle such large values, since the manual typing of these values would be unnecessarily time-consuming? (iv) Then, what kind of user interface should be provided to accommodate the P,Q,G, public key and private keys? How would they be handled by the Work Flow Language statements of WRAP and UNWRAP? (v) Should the items P,Q,G, be embedded within the WRAPPED FILES? And if so, would that compromise the security of the file, if the file is intercepted when it is transferred across an open network?

The solution to these types of problems and questions will be delineated in the following paragraphs.

Overall Process

For each software Release made, a special Release group will run a special utility that generates the values for P,Q,G, public and private keys. This particular set [ID, software level, public key, P,Q,G] will be stored by the utility as a record of the new KEYSFILE called *SYSTEM/DSAKEYSFILE.

The Release group will use the "private key" during the WRAP process to "sign" all the required system software files for that particular level.

The DSA (Digital Signature Algorithm) KEYSFILE will be distributed to customers in the same manner as the existing SYSTEM/KEYSFILE. Upon receiving the DSAKEYSFILE and the system software, the customer installs the KEYSFILE into the system and starts UNWRAPPING WRAPPED software without the need for specifying a public key.

When a user wants to WRAP his files with the "digital signature option", he must obtain a DSA keypair. Keypairs can be generated by writing a program that calls the MCP, MCP_GENERATEDSAKEYS procedure.

The private key would then be supplied to the WRAPPING routine (for example, through the TASKSTRING) attribute of the WFL_WRAP statement). The public key would be given to the receiver of the files. When these files are to be UNWRAPPED, a correct public key must be provided (for example, via the TASKSTRING attribute of the WFL UNWRAP statement) for the operation to succeed.

Handling DSA Value During Wrap and Unwrap

The WRAPPING routine, upon recognizing that a digital signature is required, obtains the P,Q,G, values from the active DSAKEYSFILE for the System Software Release (SSR) level that the system is currently running on. It then provides these values, along with the user-furnished private key, to the DSA "signing routine". This routine, after signaturing the file, returns two large integers, R and S. These two integers, along with the current SSR level, can be stored within the file by the WRAPPING process.

When this file is UNWRAPPED, the UNWRAPPING routine gets P,Q,G, values from the active DSAKEYSFILE based on the SSR level it extracts from the file. The file's R and S values, along with P,Q,G, and the user-supplied public key, are then passed to the DSA signature verification routine. If there is no user-supplied public key (as is often the case of System Software WRAPPED by the Release group), then the public key from the active DSAKEYSFILE is used.

Checksum

A checksum is calculated for the Disk File Header (DFH) for every file as it is wrapped. This ensures that there is no unintentional corruption of the Disk File Header as the file is shipped across a network. It also provides the receiver of the file some measure of confidence as to the origin of the file.

In addition to the checksum for the Disk File Header, a checksum is also calculated for the entire context of the file including the Disk File Header (DFH).

Signature and Checksum (Prevention of Corruption)

The checksum will not normally be sufficient to ensure that a Disk File Header has not been intentionally corrupted, since the checksum algorithm is not protected and is fairly easy to reproduce. There is significant overhead to validate the Disk File Header if there were no protection of the structure, other than the simple checksum. Thus, without any real protection for the Disk File Header, it would be necessary to create an entirely new Disk File Header for the original file, and then separately validate every attribute of the header before it could be considered trustworthy for application.

The Master Control Program (MCP) 10, FIG. 1B, will assume that a Disk File Header is a valid piece of data. However, it is necessary to validate the Disk File Header before the rest of the file has even been retrieved, since even the information regarding the "size" of the file is stored in the Disk File Header. In order to insure that there was no intentional corruption while the file was in transit and also provide the "receiver" of the file with some insurance that the sender of the file was indeed that who the receiver expected it to be, a digital signature may be requested when the file is wrapped by specifying a private key with which to identify the signature file while wrapping. The receiver "must" specify the file's public key in order to verify the file when unwrapping it.

Public/Private KEYS for Signaturing

A KEYS generation utility is provided as a separate utility to generate public/private key pairs to be used when signing files. Public/Private key pairs are generated using the new utility in order to be used by the wrapping interfaces for signaturing files. Users who wish to create their own utility can write a program to interface with the MCP procedure MCP_GENERATEDSAKEYS.

WRAPPEDDATA FILE Format

Figures 2, 2A:
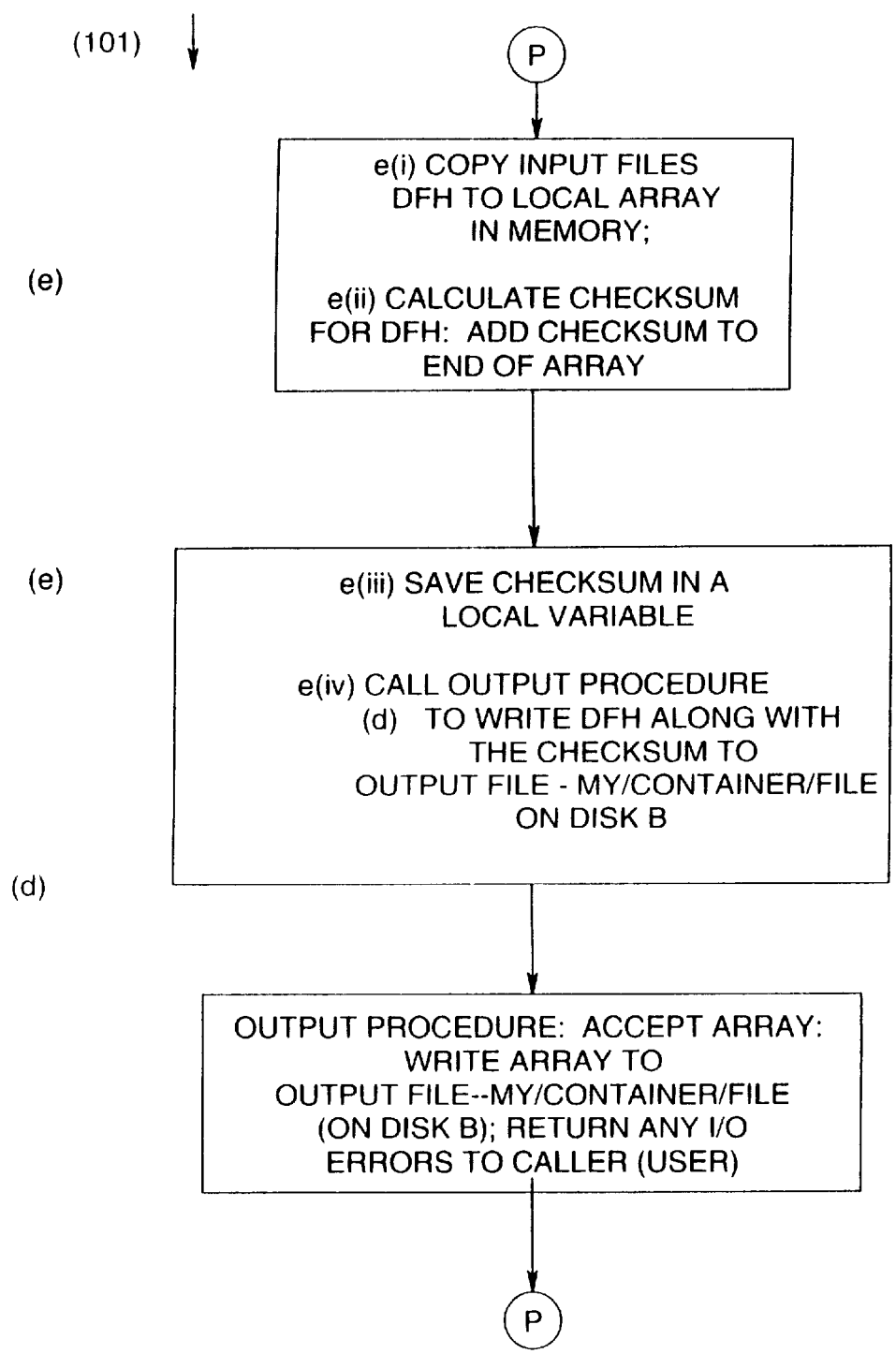
Figures 2, 2A, 3:
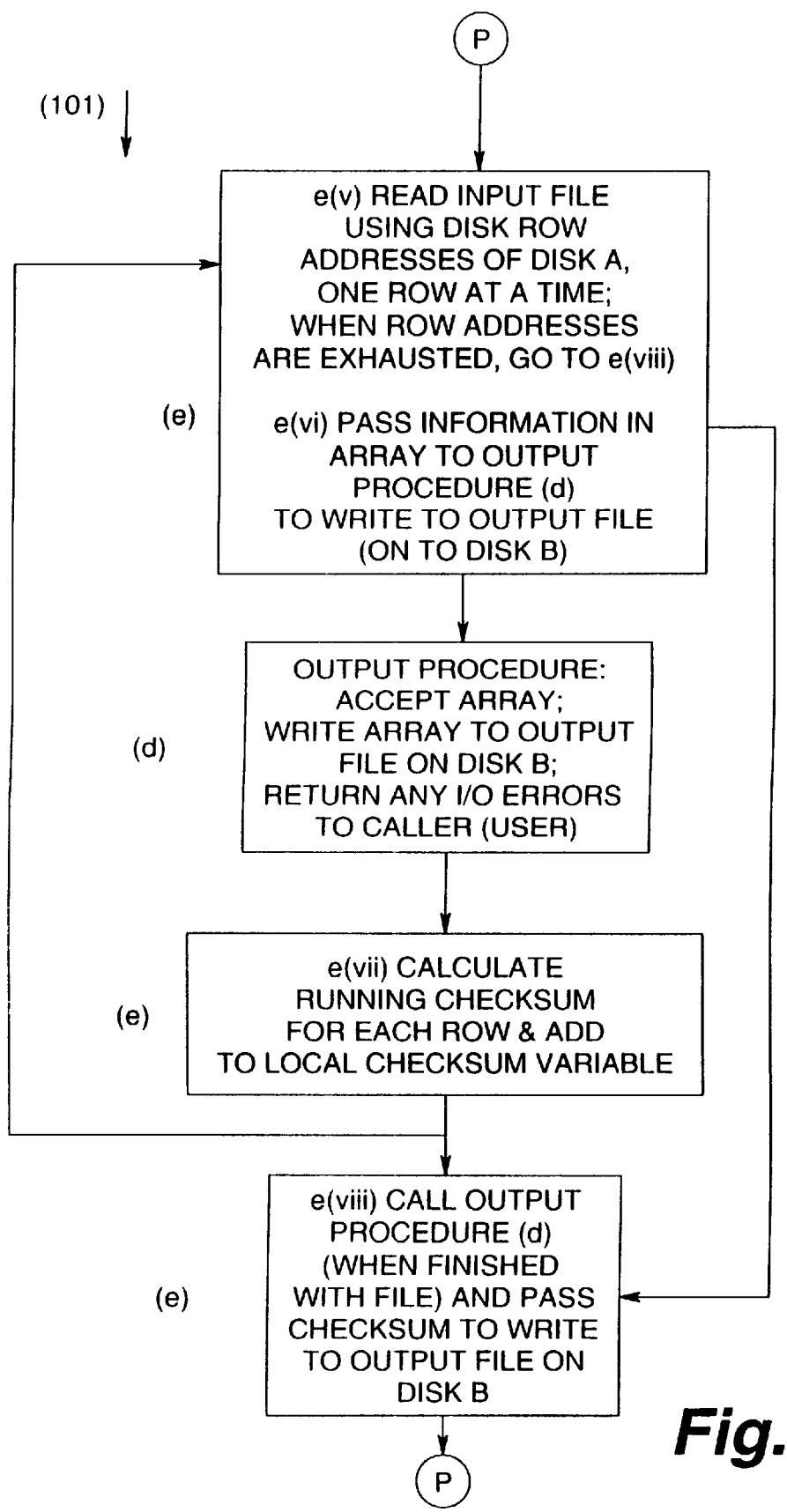
FIG. 3 is an illustration of the format for a WRAPPED-DATA file as a byte-steam file.
Figures 2, 2A, 3, 4:
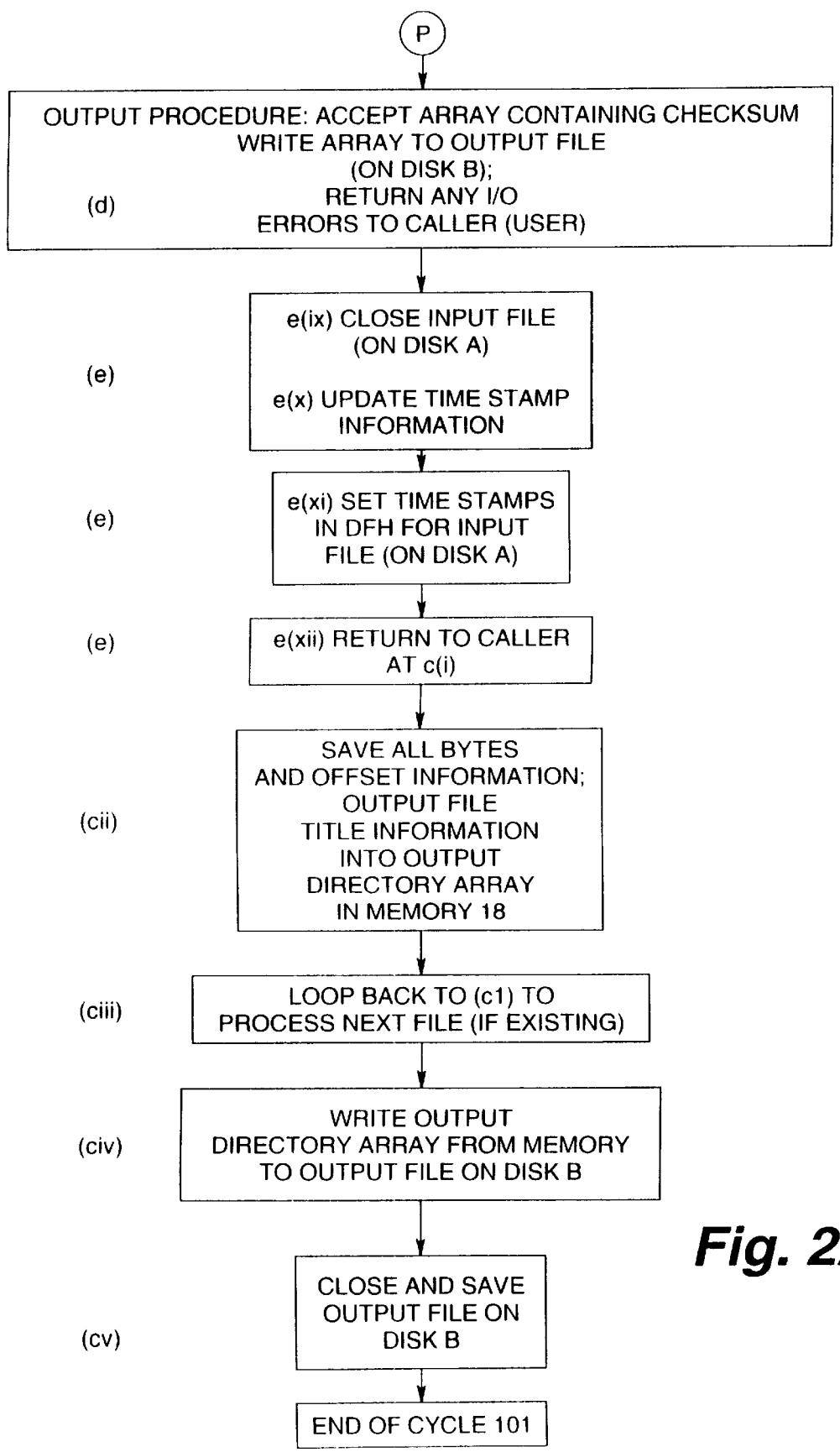

With reference to FIG. 3, there will be seen the format of the WRAPPEDDATA FILE which will be a simple byte-stream file. This file, as seen in FIG. 3, will contain several sections. The first section (i) is the word UNISYS "000010" which will be "EBCDIC" data used to indicate that this is likely to be a Wrapped file. The number associated with this identifier may be changed if the format of this file is changed.

The second block (ii) labeled "options" contains the options used when wrapping the file, such as the identifier to be used to locate the "public key" information in order to verify a file containing a digital signature.

The third block of FIG. 3 is (iii) designated as the Disk File Header, which involves a copy of the actual A Series Disk File Header for the file. This will become the actual Disk File Header for the file when it is restored to its native format after a "unwrap" operation. Additionally in block (iii), there is seen the Header checksum, which is a separate checksum for the Disk File Header itself.

The fourth block (iv) of FIG. 3 indicates "the file" which involves the contents of the file itself, written as byte-stream data.

The fifth block (v) of FIG. 3, is designated as "checksum", which will be a single word of 48 bits calculated for the file and the disk file header combined, using a private key from a public/private key pair.

The sixth section (vi) shows the digital signature as being composed of Section R and Section S. The Section R includes 11 words or a total of 528 bits. Likewise, the Section S includes 11 words of a total of 528 bits. This constitutes the digital signature portion of the transmitted file which has been wrapped.

DSAKEYSFILE File Format

The new system involves a keys file called "SYSTEM/DSAKEYSFILE". This file is stored and managed similarly to the manner of existence on earlier A Series systems which used the "SYSTEM/KEYSFILE". This file is used to store records of ID, software level, public key, PQG. These involve the following:

(i) ID: This is a unique and meaningful EBCDIC string with a length of up to 17 characters which is used for external display and for identifying the set.

(ii) Software Level: This is a real number that identifies the software level involved.

(iii) Public Key: This is a system DSA key generated along with a system private key based on certain prime numbers designated P, Q, G. This key is subsequently used in the "Unwrap" process of the A Series software.

(iv) P,O,G: These are prime numbers generated by a special utility. For a given set of (P,Q,G), there are a variety of public and private key pairs which can be generated.

The DSAKEYSFILE is an unblocked file which consists of records whose maximum record size is 60 words in length. The general information record contains miscellaneous data about the file, for example, version, number of search table records, number of key entries, etc. This record is then followed by one or more search table records which in turn, contain a number of four word search entries. Following the search table records are the data records with each containing a different set of [ID, software, public key, P,Q,G].

The main purpose of the DSAKEYSFILE is to store the P,Q,G primes used when creating public and private key pairs. It is also used to store system public keys which are normally about 60 characters long, so the caller of Unwrap does not need to enter this character string every time when he unwraps Unisys' signed software.

This procedure involves a further procedure entitled "GET_DSA_PQGKEY" which obtains the corresponding set of [P,Q,G, system public key] from the active DSAKEYSFILE based on the SSR level and return the set to the caller.

Interface Operations

This system involves new work flow language (WFL commands) designated as WRAP and UNWRAP which are provided to allow Users a simple method of invoking the new interfaces of this system.

There are two new FILEKIND values created to identify the files of the new format. These will help to prevent users from accidentally using the WRAP syntax to act on a file that has already previously been wrapped.

There is basically now provided two new programmatic interfaces designated as (i) MCP_FILEWRAPPER and also (ii) NCP_WRAPPER. These programmatic interfaces are exported out of the Master Control Program (MCP) 10.
FILEKIND This involves a set of values which will aid in identifying files that have been wrapped as long as the files have never left the environment of the first computer system, that is to say, the A Series computer. Once the file has then been copied into a non-A Series system, and then back on to the A Series system, this information is lost. The main purpose of new FILEKIND value is to ensure that a user does not accidentally attempt to WRAP an already WRAPPED file, as would be the case if a WFL WRAP command was executed on a directory of files and then the system did a Halt/Load before all of the files of a directory were wrapped. If the job were to restart after the Halt/Load, the WRAP command would begin to act on the directory over from the very beginning. If a file is encountered with a FILEKIND or with a WRAPPEDDATA value, that file will be skipped, and an error message will be issued for the file indicating that the file had already been previously wrapped.

Work Flow Language (WFL)

The Work Flow Language syntax is provided to allow a user easy access to the new programmatic interfaces. The new WFL commands permit the user to access the new interfaces to institute a wrap or an unwrap action without having to know the layout of the interfaces or having to create a program to call up these interfaces.

TASKSTRING

This is a data structure that contains private or public key information for either signaturing or for verifying the signature of the file. Thus, for a "Unwrap" operation, the TASKSTRING will be used to specify the public key that should be used to verify the signature that was calculated when the file was wrapped. Then conversely, for the WRAP operation, the TASKSTRING is used to specify the "private key" that should be used to calculate the signature of the file.

MCP FILEWRAPPER Interface

The newly developed MCP_FILEWRAPPER program is used for Work Flow Language support and User programs. A User can call this program specifying either a "Wrap" or an "Unwrap" action along with the title and the location of both the input files and the output files. Of course, the input file specified for a "Wrap" operation must not have a FILEKIND of WRAPPEDDATA. Further, the caller must have the proper privilege for both the input and the output files or directories.

The MCP_FILEWRAPPER program involves procedures which return errors. These errors are returned as display messages if the procedure is called from the Work Flow Language (WFL).

MCP Wrapper Interface

When this interface program is called to "Wrap" a file, it takes a standard form name for an existing A Series file, along with an output, or Write, procedure. The A Series files Disk File Header (DFH) will be checksum passed the output procedure as data along with the checksum. Then the file itself will be read and passed on to the output procedure as data. Finally, there will be provided (optionally) a calculated digital signature or a checksum for the entire file which will be passed to the output procedure as data.

When the MCP_WRAPPER program copies a file from disk (i.e. "Wraps" the file), it updates the files COPY SOURCE time-stamp in the Disk File Header (DFH) of the A Series file that has been wrapped.

One of the parameters for the MCP_WRAPPER is the procedure designated IOWRAP. IOWRAP is the procedure being passed, either as an output or a WRITE procedure for Wrap or an input or READ procedure for the Unwrap. The parameters for IOWRAP involve (i) LGTH which indicates the length array data in bytes; (ii) DATA is the array containing the data to be written when for wrapping or READ for unwrapping.

It is significant to note that a Disk File Header (DFH) can involve data up to about 20,000 words long. Thus, the IOWRAP parameter procedure must be able to handle at least 20,000 words in the data array in one call.

Algorithmic Sequence for Burning a Compatible Compact Disk into a Standard Industry Format FIGS. 2A (2A1, 2A2, 2A3, 2A4) and 2B illustrate the various sequential steps involved in programming a file which is taken from a first format system, such as an A Series file, and converting it to a standard industry format file which is compatible for other platforms, such as the NT platform.

Referring to FIG. 2A-1, the source User will initiate the operation at marker cycle 101 for developing the Compact Disk by entering at step (a) the command WFL WRAP MY/FILE AS MY/NEW/FILE from Disk A to Disk B.

At c(i) step (b), this command is parsed and passed from the WFL compiler 15 over to the operating system 10 and into the routine 36 designated MCP_FILEWRAPPER.

At step (c), the MCP_FILEWRAPPER program will then verify the names of the files, then open up a new file MY/NEW/FILE to be outputted, it will verify the options and then call step (e) as seen in FIG. 2A-1.

At step (cii), the MCP_FILEWRAPPER routine will close and save the output file when the MCP_WRAPPER program returns to the MCP_FILEWRAPPER.

At step (d) an output procedure is executed which provides for an array of data file information and whereby this array is written to an output file (MY/NEW/FILE). Additionally, any I/O errors are returned to the User or caller.

At step (e) of FIG. 2A-1 there is involved the MCP_WRAPPER operation. At step (e), the software operation involves verifying the input file title, and opening the file; verifying the options for wrapping the file; verifying the file license applicability by calling the operating system and verifying the feature key.

Then subsequently, (as seen in FIGS. 2A-2 through 2A-4) the step (e) involves a series of sub-steps going from (e)(i) over to (e)(xii). These involve the following:

At step (e)(i), the MCP-WRAPPER operation will copy the input files and send a Disk File Header to an intermediate local storage array in memory. This array provides temporary data storage so that there is no chance of accidentally acting on the "real" DFH or data for the file.

Then at step (e)(ii), the MCP_WRAPPER operation will add a checksum to the end of the array.

At step (e)(iii), the program will save the checksum in a local variable, and then at step (e)(iv), it will call the output procedure (d) in order to Write the Disk File Header (DFH) to the output data file.

Continuing from step (c) of FIG. 2A-1 which has called in the MCP_WRAPPER operation step (e), it will be seen that the output procedure (d) is invoked by this step (e) at e (iv), FIG. 2A-2, MCP_WRAPPER operation to pass the input file data over to be written to the new byte-stream data file at step (d), FIG. 2A-2.

At step (e)(v), FIG. 2A-3, the software will cause a Read of the input file using disk row addresses of the Disk A, one at a time, until there are no more disk row addresses for the file. When the disk row addresses are exhausted, the software will proceed to step (e)(viii). Then at step (e)(vi), the program will pass information in the array onto the output procedure (d) in order to Write the array information to the output file. For descriptive purposes, the "input" file is the file being "Read", (MY/FILE) while the "output" file is the new file being created or written (MY/NEW/FILE).

At step (e) (vii), the program calculates the running checksum for each row and adds this on to the checksum variable. Using the local checksum variable, a checksum is calculated for the entire file as it is being repackaged. This checksum will reside in the file and be later used by the unwrap operation to verify that the file was not unintentionally corrupted while transferring across a second system platform.

Then at step (e)(viii), the program will call the output procedure (d) FIG. 2A-4 and pass the checksum to write the checksum value over to the output data file, (Disk B).

At step (e)(ix), the program will close the input file, and at step (e)(x), will update the time-stamp information for the original file (A Series DFH Attribute Information).

At step (e)(xi), the program will set time-stamps in the disk file header (DFH) for the input file (Disk A) and then return [step e(xii)] to the MCP_FILEWRAPPER procedure from where it was called.

MCP_FILEWRAPPER continues at c(ii), FIG. 2A-4, and will then close and save the output file (NY/NEW/FILE) on Disk B.

MCP_FILEWRAPPER will then continue on to process the next file in its list (if there is one) by returning to c(i), FIG. 2A-1. Otherwise, if there are no new files to process, then MCP_FILEWRAPPER will Exit, thus returning (with any error information) to its Caller. This completes the operation for marker cycle 101.

Figure 2B:
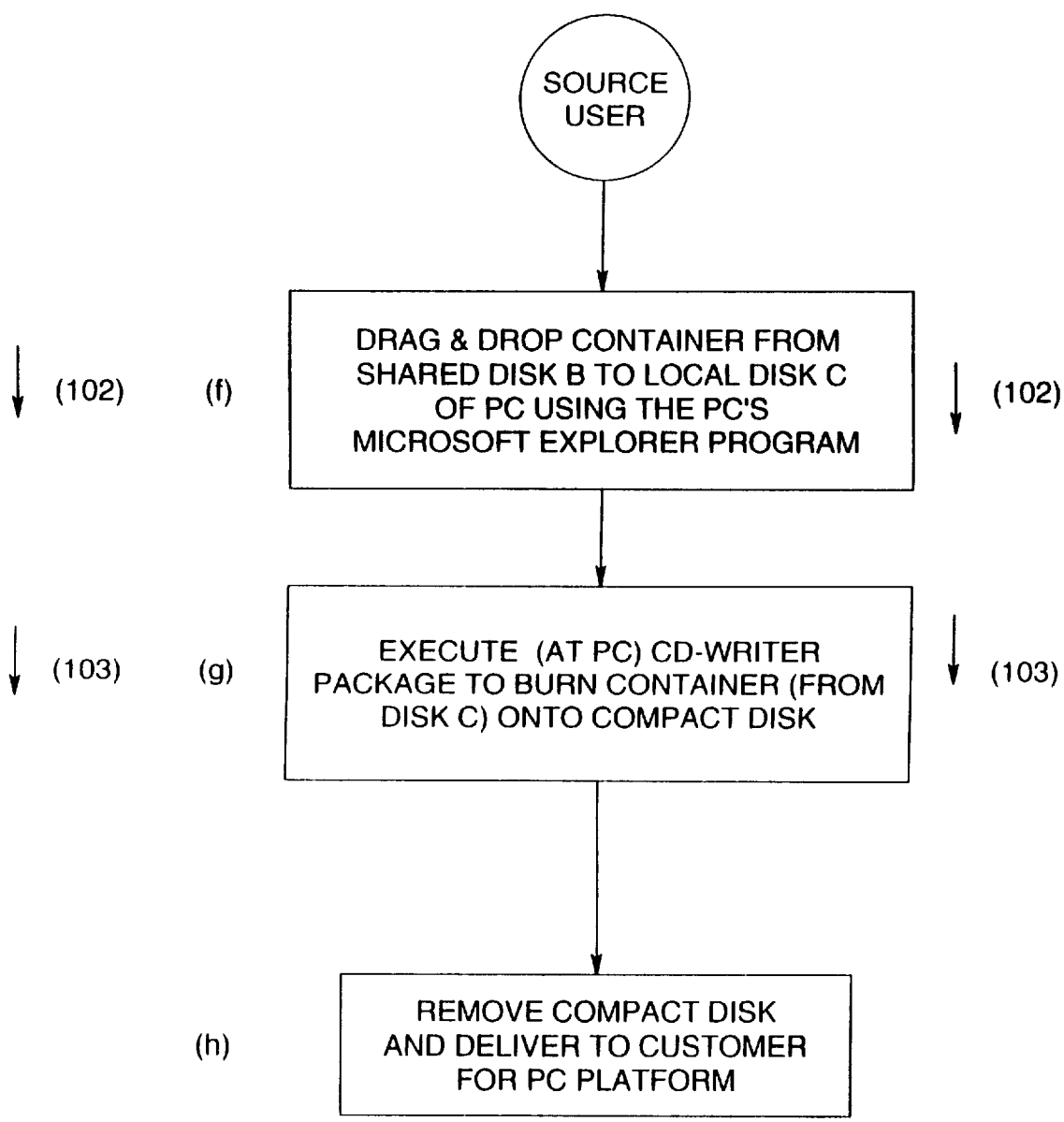

Now referring to FIG. 2B, the source user will initiate at (f) the operation (marker cycle 102 of FIG. 1A) to drag the file (MY/NEW/FILE), using the Microsoft Explorer program, from the shared Disk B,22 over to the local Disk C,24 where it becomes C:MY\NEW\FILE. Then Source User 8, using marker channel cycle 103 will initiate the CD Writer package.

The shared disk would be a LAN connected Disk B owned by the first system, that the PC has access to.

At step (g), on marker cycle 103 (of FIG. 1A and FIG. 2B), the User 8 will execute (within the client terminal 30), a CD-WRITER package in order to burn the file onto a Compact Disk, 34.

At step (h), FIG. 2B, the Compact Disk 34, once it has been burned with the files, can be removed and delivered to a customer-client terminal for that party's PC (Personal Computer) platform.

After a preliminary discussion of the Digital Signal Algorithm, then subsequently the description of FIGS. 4A, 4B, 4C and 4D, will provide a sequence for WRAPPING a native file into a text stream data file and generating the signatures which can be used to guarantee reliability of the data.

The DSA Utility

The Digital Signal Algorithm (DSA) utility has a symbol file designated SYMBOL/DSATOOLS. When compiling this symbol file with the compiler option set at "INTERNAL", a non-restricted version of the utility is produced, otherwise, a restricted version of the utility is produced. This latter version only provides the capability to generate DSA public/private key pairs from a DSAKEYSFILE and is intended for general use.

The symbol file for the DSA utility provides certain functionalities which include:

(i) the ability to generate key pairs from a sequential file containing sets of DSA information.

(ii) the ability to create or to add DSA key sets to a DSAKEYSFILE.

(iii) the ability to delete DSA key sets from a DSAKEYSFILE.

(iv) the ability to dump contents of a DSAKEYSFILE into a "sequential file" (regular text file).

(v) the ability to merge a DSAKEYSFILE into the active *SYSTEM/DSAKEYSFILE.

(vi) the ability to copy certain DSA key sets from one DSAKEYSFILE and store them into another KEYSFILE.

Both of the above versions of the code file must be executed under a "privileged" User code.

The restricted version of the DSA utility is designated "OBJECT/DSATOOLS".

A non-restricted version of the DSA utility is designated "OBJECT/DSATOOLS/FULL".

A sequential file containing sets of DSA information (designated, DSAINFO/SOURCE). Currently, this file contains 21 sets of DSA information used to generate system public and private key pairs. Only one set is used per each software release, so that these can last for a considerable period of time.

Overall Process

For each Software Release (SSR=System Software Release), the software origination group will do the following steps:

1. Create a DSAKEYSFILE containing a DSA key set for that release, including a system DSA public/private key pair. The DSA public key is part of the DSA key set. The DSA private key is kept on a secret basis.

2. Using the generated DSA private key, the software origination group will sign Unisys system software. This, however, can be omitted if software is burned into Compact Disks (CD's), since the software on a Compact Disk cannot be tampered with.

3. Distribute the signatured software and the related DSAKEYSFILE to users and customers.

Generating a System DSA Key Pair and Creating A DSAKEYSILE

Using a privileged User code, execute the following steps:

1. Create a sequential file (for example, DSAINFO442) with at least one of the DSA information sets in the file DSAINFO/SOURCE. Each DSA information set is intended to be used in any one particular Software Release, and the same set should not be used more than once.

For example, in a Command and Edit (CANDE) session, insert the following commands:
MARE DSAINFO/442SEQ
U ED
   ]INSERT DSAINFO/SOURCE from line- to line
   <editKEYID name if necessary, for example,
   SSR442DSAKEYID>
   <edit SSR number, if necessary, for example, 442.>
   ]END
SAVE FIG. 5 is a diagram illustrating how the digital signature algorithm information, together with the key ID is inserted into the DSATOOLS, which feeds one Output to the DSAKEYSFILE, and another output to the DSAKEYS/442. This results in the creation of the DSAKEYSFILE, having a public key and a DSAKEYS/442 unit which combines the public key and the private key.

Signaturing System Software Using DSA Private Key

1. Assuming that the system is running on a System Software Release designated 44.2, the method is now ready to signature the files. If the system is not ready to signature the files, it is necessary to go back to step 1, in the previous section and create a DSA key set in the *SYSTEM/DSAKEYSFILE for the particular level the system is running on.

2. It is necessary to ensure that SIGNATURESUPPORT is SL-ed. If this is not the case, then SL it with *SYSTEM/DIGITAL/SIGNATURE/SUPPORT. SL is defined in 27 item 39 of the Glossary.

For example, at the Operating Display Terminal (ODT), enter the following:
  SL SIGNATURESUPPORT=*SYSTEM/DIGITAL/SIGNATURE/SUPPORT 3. Ensure that DIGESTSUPPORT is SL-ed. If this is not the case, then SL it with:
  *SYSTEM/MESSAGE/DIGEST/SUPPORT
For example, at the Operator Display Terminal, enter the following:
  SL DIGESTSUPPORT=*SYSTEM/MESSAGE/DIGEST/SUPPORT 4. Now operate to signature the software by using the system DSA private key. Files can be wrapped as separately Wrapped files, or as Containers. The latter, (Containers), allows a number of Wrapped files to be grouped into one single entity. For the software that is to be burned into a Compact Disk (CD), there is no need to signature them since they cannot be altered after they are put into a Compact Disk.

EXAMPLE

Using the WFL WRAP syntax, to pass the system DSA private key in the task attribute TASKSTRING, a Work Flow Language (WFL) job can then be created to automate the wrapping process.

In a Command and Edit (CANDE) session, do the following:
  WFL WRAP AFILE AS WRAPPED/AFILE;TASKSTRING=<system DSA private key>
  WFL WRAP ADIR/=INTO CONTAINERA; TASKSTRING=<system DSA private key>

It should be noted that the files can also be wrapped and signatured using a programmatic interface to the MCP-exported entry point MCP_FILEWRAPPER.

Wrap And Signature File

FIG. 6 is an illustration of wrapping and signaturing a file. Here, it is seen that the wrapping sequence receives information from the DSAKEYSFILE. It also receives an input from the system DSA private key, in addition to receiving the file information, after which the wrapping sequence will produce the signatured file.

5. To make sure that wrapped files are signatured correctly, it is desirable to verify these files before shipping them out to customers over the Internet, or via the CD-ROM.

Examples Utilizing the Unwrapped Sequence for System Software that Was Signed with a System DSA Private Key Use the WFL UNWRAP syntax, but do not pass any string in the TASKSTRING attribute. The system will pick-up the corresponding system DSA public key in the file *SYSTEM/DSAKEYSFILE for verification. This step can also be incorporated into the same Work Flow Language (WFL) job that also WRAPS files.
  WFL UNWRAP WRAPPED/AFILE AS UNWRAPPED/AFILE
  WFL UNWRAP*=AS UNWRAPPED/=OUTOF CONTAINERA As seen in FIG. 7, the unwrap sequence is fed information from the DSAKEYSFILE, and also fed by the signatured FILE in order to then produce the original native file which is compatible for the original computer system which uses the Master Control Program.

Distribution

The distribution of the signatured files and the DSAKEYSFILE is done using the ordinary procedures for shipment which can be done via Internet transfer or by CD-ROM.

Using Digital Signatures with Wrapped Files and Wrapped Containers

With the advent of the WRAP/UNWRAP feature, the present system also gives users the ability to optionally sign wrapped files and wrapped containers with digital signatures. Like a normal signature on a real piece of paper, a digital signature allows the recipient of a signed wrapped file to be certain of its origin. Unlike a normal signature, the digital signature is electronically represented as binary data rather than handwritten characters. This allows the signature to be embedded within the file, and it enables the system to do some special calculations in order to authenticate the signature and verify that the file has not been tampered or altered during its transmission.

Digital signature "creation" is based on the data within a file and a private key. Similarly, digital signature "authentication" is based on the same data of the file and a corresponding public key. The private key and public key are generated as a pair by the system, so even though they are not the same, they still share some underlying common mathematical properties. By differentiating the public key and the private key of a key pair, one cannot use either key for both signing and verification. Thus, a person possessing only a "public key", though is capable of "authenticating" a wrapped file's digital signature "created" by a corresponding "private key", but cannot use it to produce the same signature. On the other hand, a person with only the private key will not be able to verify the signed wrapped file.

The digital signature algorithm (DSA) also ensures that a public key belonging to one key pair cannot be used to validate the digital signature derived from a private key of another key pair.

Since the DSA is not an encryption algorithm, signing a wrapped file or wrapped container does not scramble its data. Instead the DSA makes a pass through the data stream and applies the specified private key to come up with a checksum-like binary hash pattern which is then inserted into the resulting file.

When creating a wrapped file or wrapped container with digital signature, the originator should perform the following steps:
  Obtain a DSA key pair that consists of a public key and a private key
  Specify the private key in the wrapping process to create a digitally signed wrapped file (or container)
  Send the signed wrapped file to its intended recipient
  Send the public key to the same recipient The last two steps should get executed separately to make the file more secure. If both the signed wrapped file and the public key are transmitted in the same message, it may be possible for some unauthorized party to intercept the message, unwrap and modify the file, then sign it with their own private key, and forward, to the unsuspecting recipient, the altered signed wrapped file and a different public key.

Upon receiving a signed wrapped file or container, the recipient of the file should perform the following steps:

obtain the corresponding public key

Specify the public key in the unwrapping process. If the system does not attempt to authenticate the file's digital signature or fails to do so, the signed wrapped file is either corrupted or was modified and should not be trusted.

The following sections describe in detail what customer should do to unwrap the signed wrapped files and containers (such as ICs), and how one can wrap and unwrap one's own files with digital signatures.

Getting Started: New System Libraries

There are two new System Library files that need to be installed and SL'ed (Glossary, item 39) on the system before one can utilize the digital signature feature. These are SYSTEM/DIGITAL/SIGNATURE/SUPPORT and SYSTEM/MESSAGE/DIGEST/SUPPORT. These files are shipped with software releases beginning with HMP NX3.0/SSR44.2. If these files are not currently available on the system, they may be obtained by ordering the SECURITY Interim Correction (IC) for releases beginning with SSR 42.3. From the ODT, install these files as follows:

SL SIGNATURESUPPORT=*SYSTEM/DIGITAL/SIGNATURE/SUPPORT

SL DIGESTSUPPORT=*SYSTEM/MESSAGE/DIGEST/SUPPORT

New DSA KEYSFILE

A customer also needs to obtain a copy of the SYSTEM/DSAKEYSFILE. This keysfile contains one or more DSA information "sets" where each corresponds to a particular SSR (System Software Release). One can only wrap and unwrap files with digital signatures for the levels indicated in the DSA keysfile. If the *SYSTEM/DSAKEYSFILE already exists on the Halt/Load family, the available levels can be shown by entering the ODT (Operator Display Terminal) command: IK DSASHOW Beginning with HMP NX4.0/SSR45.1, the DSA keysfile is shipped with standard software releases. For earlier releases, a customer needs to call the support organization to obtain a copy of this file. This file will be delivered through the same process as *SYSTEM/KEYSFILE because wrapping the DSA keysfile could compromise Unisys' digital signature security mechanism.

The DSA keysfile is cumulative, that is—a DSA keysfile of a later SSR release will contain the DSA information set of that release plus all DSA information sets of earlier releases [Note: All supported software levels earlier than SSR 44.2 will use the 44.2 DSA information set.] Thus, installing a DSA keysfile is as simple as copying the most current DSA keysfile to one's Halt/Load family. However, only the DSA keysfile with the name *SYSTEM/DSAKEYSFILE will be recognized by the system as the active system DSA keysfile. To install a DSA keysfile as the active DSA keysfile, the following command is used:

COPY<DSA keysfile filename>AS *SYSTEM/DSAKEYSFILE TO <Halt/Load Pack>(PACK)

Signing And Verifying One's Own File

Obtaining One's Own Public/Private Key Pairs

In order to add a digital signature to one's own files during the wrapping process, one must first obtain a public/private key pair. Generating key pairs involves writing a program that interfaces with the new MCP procedure MCP_ GENERATEDSAKEYS. One may want to use the sample program listed at the end of this document (sample program to generate DSAKEYPAIRS, to help one get the key pairs, or one may want to modify it to suit one's own needs.

Note that key pairs are generated based on an SSR level. This means one cannot use a private key of one SSR level to digitally sign wrapped files for another SSR level.

Creating Digitally Signed wrapped Files

Once a key pair is generated, one can use the WFL WRAP syntax to create a digitally signed wrapped file. By passing the private key through the task attribute TASKSTRING of the WRAP statement, one indicates the desire to add a digital signature to the file.

By default, the system will produce the signed container for the current software level. At times, one may want to create a digitally signed wrapped file for an SSR level different than that of the running system (for example, the recipient of the file may not be on the same SSR level as the operator). For such situations, one will need to specify the targeted SSR level for the WRAP statement through the task attribute TARGET. The level value should be represented as a whole number without the decimal point.

Distributing and Verifying Digitally Signed Wrapped Files

One can now send the signed wrapped files to intended users. In order for these files to be verified and unwrapped, one also needs to send the corresponding public key to them. To ensure the wrapped files are not compromised in transit, one should avoid sending both signed files and public key at the same time. For instance, if using e-mail as the delivery mechanism, send the public keys in a separate mail message from the wrapped files they are protecting. If files are to be transferred over the Internet, one can allow the wrapped files themselves to be down loaded, but simply display the public key for the recipient to "cut and paste" into the WFL WRAP statement, or offer to send the public key to the recipient via a provided e-mail address.

Recipients of the signed files should use the SFL UNWRAP syntax to verify and unwrap files, passing the public key one was provided through TASKSTRING.

Dealing with Digital Signatures

One should not release one's private key because it may compromise the signed wrapped file's security.

Because both public and private keys are long hex strings, when one needs to execute many WRAP and UNWRAP statements dealing with digital signatures, it may be better for one to create a WFL job and associate the key values with string variables. For instance,
STRING PUBLICKEY,PRIVATEKEY;
PUBLICKEY:="<hex string for DSA public key>";
PRIVATEKEY:="<hex string for DSA private key>";
WRAP MYDIR\=INTO MYCONTAINER;TASKSTRING=PRIVATEKEY;
UNWRAP=OUTOF YOURCONTAINER;TASKSTRING= PUBLICKEY;

Since wrapping files with digital signatures is processor-intensive, one should generally avoid creating many separate signed wrapped files. One may want to put them into one single signed container instead.

One should not trust files that are supposedly wrapped with digital signatures under conditions when the system does not either attempt to verify the signature or fails to do so.

Sample Program to Generate DSA Key Pairs

Begin

This sample program demonstrates the basic technique on how to generate DSA key pairs based on a specified SSR level. The resulting public and private key pairs then can be used in the WFL WRAP/UNWRAP statements to sign and verify signatured wrapped files.

```
    FILE DSAKEYS     (KIND=DISK, MAXRECSIZE=14, MINRECSIZE=14,
                     BLOCKSIZE=420, BLOCKSTRUCTURE=FIXED,
FILEKIND=DATA,
                     FRAMESIZE=48, NEWFILE=TRUE);
    LIBRARY MCP (LIBACCESS=BYFUNCTION,
FUNCTIONNAME="MCPSUPPORT.");
    REAL PROCEDURE MCP_GENERATEDSAKEYS    (SOFTLEVEL,
NUMOFPAIRS, ARY,
                                                  PROC, OPT);
        VALUE    SOFTLEVEL, NUMOFPAIRS, OPT;
        REAL     SOFTLEVEL, NUMOFPAIRS, OPT;
        ARRAY    ARY [0];
        REAL     PROCEDURE PROC (INX, PUBKEY, PRIKEY);
                 VALUE  INX;
                 REAL   INX;
                 ARRAY PUBKEY, PRIKEY [0]; FORMAL;
        LIBRARY MCP;
    REAL PROCEDURE WRITEKEYPAIR (PAIRNUM, PUBKEY, PRIKEY);
    VALUE    PAIRNUM;
    REAL     PAIRNUM;
    ARRAY    PUBKEY, PRIKEY[0];
    BEGIN
        ARRAY    BUFF [0:13];
        DEFINE   WRITEIT    =
                 BEGIN
                    WRITE(DSAKEYS, 14, BUFF);
                    REPLACE POINTER(BUFF) BY " " FOR 14
WORDS;
                 END #,
                 WRITEHEXSTR (PREFIX, ARY, INX, LEN) =
                 BEGIN
                    REPLACE POINTER(BUFF) BY PREFIX,
                        POINTER(ARY[INX],4) FOR LEN WITH
HEXTOEBCDIC;
                    WRITEIT;
                 END #;
        % Notify user about the progress. Useful if
USEUSERPROCF is set.
        DISPLAY ("Key pair #" ! ! STRING(PAIRNUM,*) ! ! "
generated.");
        % Keep key pair information secret. Write it out to
file.
        REPLACE POINTER(BUFF) BY "KEY PAIR #", PAIRNUM FOR
* DIGITS, ":";
        WRITEIT;
        WRITEHEXSTR   ("PublicKey =  ", PUBKEY, 0, 48);
        WRITEHEXSTR   ("             ", PUBKEY, 4, 48);
        WRITEHEXSTR   ("             ", PUBKEY, 8, 36);
        WRITEHEXSTR   ("PrivateKey=  ", PRIKEY, 0, 48);
        WRITEHEXSTR   ("             ", PRIKEY, 4, 48);
        WRITEHEXSTR   ("             ", PRIKEY, 8, 36);
    END;
    DEFINE    % Returned value
              CODEF     = [15:08] #,
              SCODEF    = [31:16] #,
              % OPT word
              USEUSERARYF   = [01:01] #,
              USEUSERPROCF  = [00:01] #,
              % Others
              NUMRETKEYS    = KEYARY[0].[15:16] #,
              FIRSTKEY      = KEYARY[0].[31:16] #,
              NUMREQKEYS    = 4 #,         % Number of
requested keypairs
              KEYWORDS      = 11 #,        % Words for
each key
              SSRLEVEL      = 442 #;       % SSR Level
44.2
    REAL     R, I;
    ARRAY    KEYARY [0:(KEYWORDS*2*NUMREQKEYS)],
             PUBKEY [0:(KEYWORDS-1)],
             PRIKEY [0:(KEYWORDS-1)];
MAIN PROGRAM
Generate 10 DSA public/private key pairs for SSR level
44.2.
Because both USEUSERARYF and USEUSERPROCF return the same
information, we normally set either flag but not both.
This is just an example to illustrate how both cases
work.
    R := MCP_GENERATEDSAKEYS (SSRLEVEL, NUMREQKEYS,
```

-continued

```
KEYARY, WRITEKEYPAIR,
                                 0 & 1 USEUSERARYF & 1
USEUSERPROCF);
    IF BOOLEAN (R) THEN
       DISPLAY ("DSA key generation Error #" ! !
STRING(R.CODEF,*) ! !
              " - SubCode #" ! ! STRING(R.SCODEF,*));
If USEUSERARYF is set, process the returned info.
    IF (NUMRETKEYS GTR 0) THEN      % Got some good key
pairs
    BEGIN
       FOR I:=1 STEP 1 UNTIL NUMRETKEYS DO
          BEGIN
             R := ((I-1) * 2 * KEYWORDS) + FIRSTKEY;
             REPLACE POINTER(PUBKEY) BY
POINTER(KEYARY [R])
                                    FOR KEYWORDS
WORDS;
             REPLACE POINTER(PRIKEY) BY
POINTER (KEYARY [R+KEYWORDS])
                                    FOR KEYWORDS
WORDS;
             WRITEKEYPAIR (I, PUBKEY, PRIKEY);
          END;
       END;
    LOCK (DSAKEYS);
END.
```

Figure 4B:
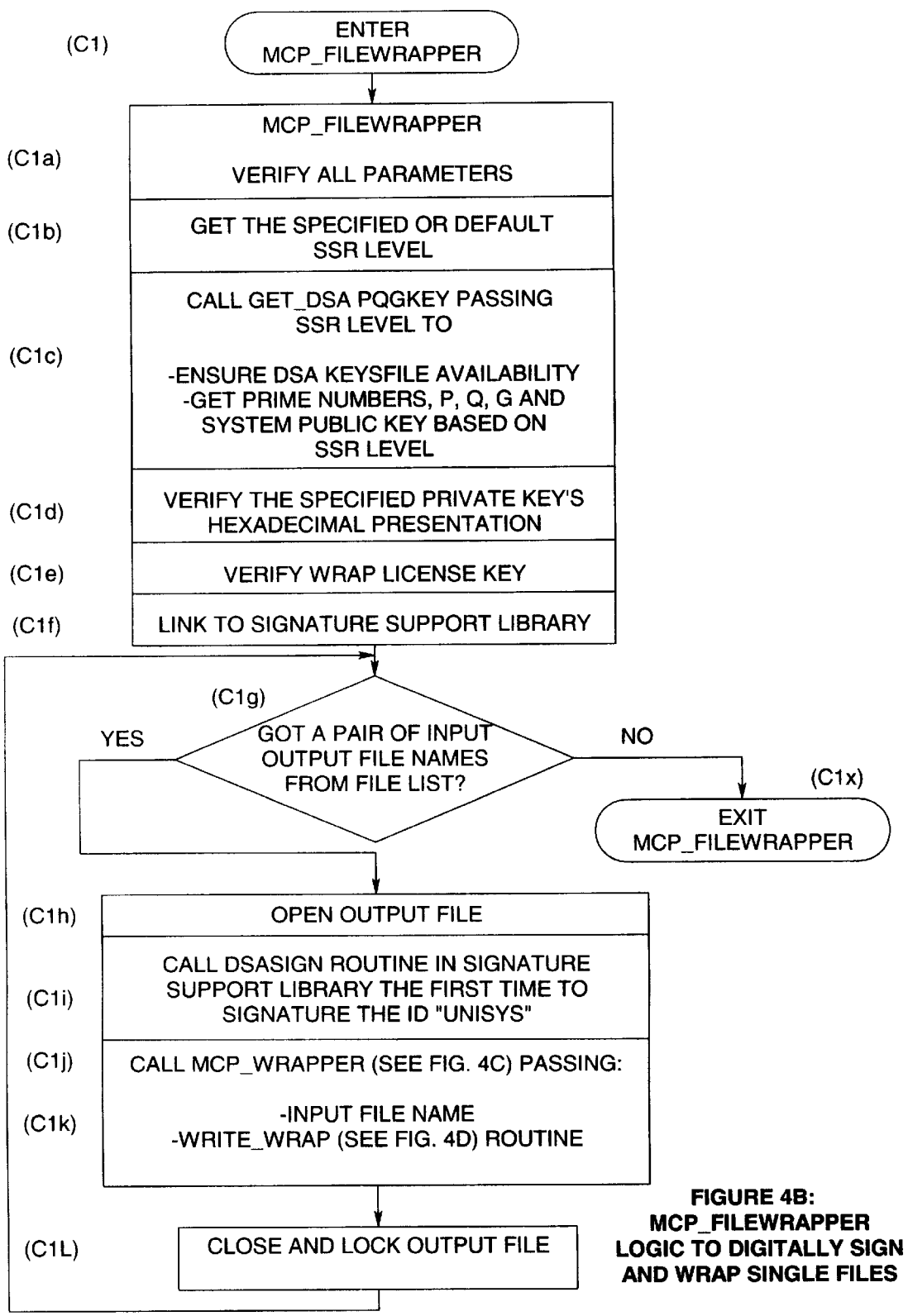
FIG. 4B is a flow chart illustrating the MCP_FILEWRAPPER logic to digitally sign and wrap single files.

FIG. 4B is an exposition of steps C and D of FIG. 4A, wherein by referring to FIG. 4B, it is seen that at step C1, there is an entering of MCP_FILEWRAPPER routine (36).

At step C1a, the program will verify all the parameters.

At step C1b, the routine will get the specified or default SSR level.

Step C1c, the routine will call the program GET_DSA_PQGKEY while passing the SSR level in order to:—ensure the DSAKEYSFILE availability;—get the prime numbers P,Q,G and the system public key based on the SSR level.

At step C1d, there will be a verification of the specified private keys using a hexadecimal presentation.

At step C1e, the routine will verify the wrap license key.

At step C1f, a link will be made to the Signature Support Library (FIG. 1B).

The Signature Support Library exports the procedure DSASIGN for MCP_FILEWRAPPER to use.

At step C1g, a decision tree is initiated to see if there is a pair of Input and Output file names from the file list. If the answer is "NO", then an exit is made at step C1x, to exit the routine of MCP_FILEWRAPPER 36.

If the answer is "YES", then step C1h will open the Output file, and step C1i will call the DSASIGN routine in the Signature Support Library for the first time in order to signature the ID "UNISYS".

At step C1j, the routine will call the program designated MCP_WRAPPER (38) according to the steps of FIG. 4C, and thus passing:—Input file name;—WRITE_WRAP according to the routine shown in FIG. 4D.

Then at step C1L, the routine will close and lock the Output file.

Appendix I is attached to indicate how to run the DSA utility program routine.

Described herein has been a method and system whereby native specialized files in a first computer system, can use the operating system of the first computer system together with first and second programmatic interfaces therein in order to transform a file (native to the first system) into a standard byte-stream file which is utilizable by many other types of computer platforms (second system), and which byte-stream files can be burned into a CD-ROM (or transported via an open network) which is then available for utilization by multiple numbers of other system platforms. The integrity for transforming the native files of the first system into a standard byte stream file utilizable by other computer platforms, and which can be transferred over the Internet, is rendered reliable by the use of the digital signaturing systems described above.

While other variations and embodiments of the described method may be implemented for various purposes, the invention is defined by the following claims appended herein.

APPENDIX I
HOW TO RUN THE DSA UTILITY

General description

This utility is used to:
(1) Add DSA key sets to a DSA keysfile
(2) Delete DSA key sets from a DSA keysfile
(3) Merge a DSA keysfile to the active
    *SYSTEM/DSAKEYSFILE
(4) Extract DSA key sets from one DSA keysfile to another
(5) Generate DSA public and private key pairs
A restricted version of this utility only supports function (5). All other functions are intended for internal use, specifically - the Unisys software release group. A non-restricted version of this utility is only available when compiled with the compiler option INTERNAL set. Because security restriction is required by the MCP entry-point DSAKEYSFILEHANDLER, this utility can only be run succcessfully by a privileged user, or the codefile must be PU-ed.

Usage

To run this utility, enter:
    R <this utility codefile> ("<request>")
<request> can be one of the following:
    ADDKEYS
    DELETEKEYS
    GETKEYS
    DUMPKEYS

APPENDIX I
HOW TO RUN THE DSA UTILITY

MERGEKEYS
EXTRACTKEYS

Syntax for adding DSA key sets:

```
        ---ADDKEYS----FIN--------- <filename> ----------->
                      |- = -|

>----------------------------------------------------------------|
              |- KFOUT -------<filename>-|
                      |- = -|
```

FIN: Sequential file containing DSA information. The format of this file is described below.
KFOUT: DSA keysfile where DSA key sets are to be added. If omitted, active DSA keysfile is used. If it does not exist, a new DSA keysfile will be created.

Syntax for generating DSA key pairs:

```
        ---- GETKEYS -------------------------------------- |
                  |                                        |
                  | |<------------------------------------| |
                  | |                                      | |
                  |-----/1\-- SSR --------- <number> ------|
                  |          |     | |- = -|               |
                  | -/1\-- NUM - |                         |
                  |                                        |
                  | -/1\-- FIN---------<filename>- |       |
                  |              | | |- = -|               |
                  | -/1\-- FOUT-- |                        |
                  |                                        |
                  | -/1\-- KFIN-- |                        |
                  |                                        |
                  | -/1\-- KFOUT- |                        |
                  |                                        |
                  | -/1\-- VALIDATE -------- T --- |
                          |- = -|   |- F -|
```

SSR: the level from which key pairs are to be generated (e.g. 442). Its default value is the current SSR. SR is intended for use with KFIN, but not with FIN since SSR should already be specified in FIN. If FIN is specified, SSR is ignored.
NUM: the number of key pairs to be generated. Its default value is 1.
FIN: Sequential file containing prime numbers for creating key pairs if KFIN is not specified. Use of FIN excludes the KFIN and SSR specifications. The format for this sequential file is described below.
KFIN: the DSA keysfile whose DSA information will be used to generate key pairs. The default is the *SYSTEM/DSAKEYSFILE on the halt/load family. It is mutually exclusive of the FIN specification.
FOUT: the destination sequential file where key pairs are stored. If FIN is specified, this file also contains FIN's prime numbers which make it suitable for the ADDKEYS request. Its default title is DSAKEYS.
KFOUT: allows the last generated key pair from each set {SSR, KEYID, P, Q, G} in the file FIN to be added to a DSA keysfile directly without the need to run this utility again with the ADDKEYS request. NOTE: This option is only available when compiling with INTERNAL set.
VALIDATE indicates whether the utility will do tests on generated key pairs. Its default value is (T)rue.

Syntax for deleting DSA key pairs:

APPENDIX I
HOW TO RUN THE DSA UTILITY

```
                              |<---- , ---- |
                              |             |
        ---- DELETEKEYS -- KEYID ---------- <string> ------------>
                              |- = -|

>----------------------------------------------------------------|
              |- KFIN -------- <filename> -|
                      |- = -|
```

KEYID: ID of the DSA key sets to be deleted.
KFIN: DSA keysfile where key sets are to be deleted from. If not specified, *SYSTEM/DSAKEYSFILE is used.

Syntax for dumping a DSA keysfile

```
        ---- DUMPKEYS -- FOUT -------- <filename> ------------->
                              |- = -|

>----------------------------------------------------------------|
              |- KFIN -------- <filename> -|
                      |- = -|
```

FOUT: Sequential file where contents of KF are dumped to.
KFIN: Source DSA keysfile whose key sets are to be dumped. If not specified, *SYSTEM/DSAKEYSFILE is used.

Syntax for merging a DSA keysfile to the active one

```
        ---- MERGEKEYS -- KFIN ------- <filename> --------------|
                              |- = -|
```

KFIN: the DSA keysfile to be merged with *SYSTEM/DSAKEYSFILE on halt/load family.

Syntax for extracting DSA key sets from one DSA keysfile to another

```
        ---- EXTRAKEYS ----- KEYID ------ <string> ------------>
                              |    |- = -|    |
                              |-- SSR -------- <number>-|
                                       |- = -|

>---------------------------KFOUT -------- <filename>-- |
              |-- KFIN ------- <filename> --|      |- = -|
                              |- = -|
```

KEYID: all DSA key sets with IDs containing the specified will be copied to KFOUT.
SSR: DSA key set for the level specified by SSR is copied to KFOUT.
KFIN: Input DSA keysfile where the key sets are to be copied. If not specified, the *SYSTEM/DSAKEYSFILE on the halt/load family is used.
KFOUT: Output DSA keysfile where copied key sets are stored.

=== Format of FIN, FOUT =========================
User-specified file FIN and the output file FOUT created by the utility are sequential files sharing the same format. These file contain a number of DSA key sets and comment lines.
  Comment lines should be preceded by the character '%'.
  Each DSA key set should be separated by a semicolon. The last DSA key set in the file should also end with a semicolon.

Valid entries in a key set are as follows:

| Keyword | Value | Explanation |
|---|---|---|
| SSR | integer | Specifies which SSR level. The must be between 442 and 999. (e.g. SSR=442) |
| KEYID | string | A unique ID to the key set. Its string can consist up to 17 alphanumeric |

-continued

APPENDIX I
HOW TO RUN THE DSA UTILITY

|  |  |  |
|---|---|---|
|  |  | characters (hyphen and underscore can also be used) (e.g. KEYID=SSR442_DSAID) |
| PUBLICKEY | hex string | DSA public key generated from the same P, Q, G values in its set. Its hex string must be enclosed by quotes. Longer string continues on the next line. (e.g. PUBLICKEY= "0123456789ABC" "DEF0123456789") |
| PRIVATEKEY | hex string | DSA private key generated from the same P, Q, G values in its set. Usage similar to PUBLICKEY. |
| P | hex string | Prime number P. |
| Q | hex string | Prime number Q. |
| G | hex string | G value. |

Each keyword should be followed by '=', and each entry should be separated by a comma.
Although the utility allows PRIVATEKEY in the file FIN to the ADDKEYS request, PRIVATEKEY is not actually used. Thus, you can store PRIVATEKEY there for reference. However, it is recommended that you should keep PRIVATEKEY separately and make sure that no unauthorized users can get access to it.
For ADDKEYS, the request requires FIN to contain at least one DSA key set. Entries required for all DSA key sets in this request are {SSR, KEYID, PUBLICKEY, P, Q, G}. Note that PRIVATEKEY is not a part of the added key set and will be ignored.
For GETKEYS, if FIN is specified, entries required for a DSA key set consist of {SSR, KEYID, P, Q, G}. The utility will generate public/private key pairs and write {SSR, KEYID, PUBLICKEY, PRIVATEKEY, P, Q, G} out to the file DSAKEYS or to the file indicated by FOUT. The resulting file then can be used as FIN to the ADDKEYS request.
If FIN is not specified for GETKEYS, KF will be used instead. However, only (SSR, KEYID, PUBLICKEY, PRIVATEKEY} is wriiten out to the file FOUT by the utility. Prime numbers P, Q, G extracted from KF are not included.
=== Procedural Steps and Usage =========================
1.  If you start from scratch, create a sequential file that contains at least one DSA key set with {SSR, KEYID, P, Q, G} in it. For example, the contents of file MY/PRIMES may include something like these:
    % Primes for key set # 1
    SSR = 999,
    KEYID = SSR999-KEYID,
    P = "D411A4A0E393F6AAB0F08B14D1845866"
    "5B3E4BDCE2544543FE365CF71C86224"
    "12DB6E7DD02BBE13D88C58D7263E9023"
    "6AF17AC8A9FE5F249CC81F427FC543F7",
    Q = "B20DB0B101DF0C6624FC1392BA55F77D"
    "577481E5",
    G = "B3085510021F999049A9E7CD3872CE99"
    "58186B5007E7ADAF25248B58A3DC4F71"
    "781D21F2DF89B71747BD54B323BBECC4"
    "43EC1D3E020DADABBF7822578255C104";
2.  Run the utility to get a DSA public/private key pair for the key set in MY/PRIMES. A sequential output file with the name MY/KEYSET will be created.
    RUN <DSA utility> ("GETKEYS FIN=MY/PRIMES FOUT=MY/KEYSET")
3.  Use information in MY/KEYSET to create a new DSA keysfile called *SYSTEM/DSAKEYSFILE on the halt/load pack HLPACK:
    RUN <DSA utility> ("ADDKEYS FIN=MY/KEYSET KF=*SYSTEM/DSAKEYSFILE ON HLPACK")

What is claimed is:

1. A method, initiated by a source-User, for creating a data file and its verifying signature into a format compatible to two or more different platforms, comprising the steps of:

(a) utilizing a specialized predefined keysfile (DSAKEYSFILE) to store sets of digital signature information, wherein each set corresponds to a particular software level and each set includes the following data items:
  (i) ID string for the set;
  (ii) the value of the Software Release Level (SSR);
  iii) three prime numbers designated as P,Q,G used for calculating a signature;
  (iv) a proprietary system public key derived from the prime numbers in item (iii) above for the particular SSR indicated in item (ii);

(b) initiating a wrap-packaging action utilizing a Private key of a Public/Private key-pair which is generated by an operating system utility program (MCP_GENERATEDSAKEYS), for transforming a first data file, having a first format in a first platform into an industry-standard text stream data format as a data file compatible to a second platform;

(c) executing the said wrap-packaging action by utilizing the data of the file, by utilizing the information stored in the said DSAKEYSFILE, and utilizing the User-supplied private key to develop an industry standard text file containing both the data and an embedded digital signature in a format acceptable for burning onto an industry-standard Compact Disk said text file being immune from unwarranted manipulation.

2. The method of claim 1 wherein step (c) includes the step of:

(c1) executing said wrap-packaging action by utilizing the data of the file, by utilizing the information stored in the said DSAKEYSFILE, and utilizing the User-supplied private key to develop a simple text file containing both the data and a signature in a format acceptable for a protocol transmittable over the Internet.

3. The method of claim 1 wherein step (c) includes the steps of:

(c1) transforming a data file (21) on a first disk (20) in a first platform (14) having a first format into an industry-standard text stream data format as a data file (23) on a second disk (22);

(c2) transferring said industry-standard text stream data file (23) onto a third disk (24) of a second platform (30) as a resultant file (24);

(c3) initiating said second platform (30) to transfer said industry-standard text stream data file (25) onto a CD-Write Module (30w);

(c4) enabling said CD-Write Module to burn the industry-standard text stream data file (25) onto a Compact Disk (CD,34).

4. The method of claim 3 wherein step (c) includes the step of:

(i) utilizing Internet or E-mail software to transport said data file (25) on said third disk (24) over to an open network (40).

5. A system, available to a client-user, for converting a specialized protocol data file in a first platform into a standard protocol format usable for the Internet and other different platforms and providing a digital signature for verification of the integrity of the converted data file, said system comprising:

(a) a first platform (14) containing a Master Control Program (MCP) means having an internal MCP structure (DSAKEYSFILE) used to generate Public/Private key pairs associated with each System Software Release Level, said MCP using a specialized protocol for a data file (MY/FILE,21) stored on a first storage means (Disk A,20) of said first platform (14);

(b) program means (36) to utilize a private key of said Public/Private Key Pair and to transform such specialized protocol data file (MY/FILE,21) into an industry standard text stream data file (MY/NEW/FILE,23) containing an embedded signature in said converted data file (C:\MY\NEW\FILE,25);

(c) second shared storage means (22) for holding said text stream data file (MY/NEW/FILE,23) containing said embedded signature transferred by said first platform (14) from said storage means (Disk A,20);

(d) a second platform (30) connected to said first platform and said second shared storage means (Disk B,22) for storage of said industry standard text stream data file (C:\MY\NEW\FILE,25) on a third storage means (Disk C,24);

(e) software means (30y) for transferring said industry standard text stream data file (25) onto to an open network 40.

6. The system of claim 5 which includes:

(g) A CD Writer package unit (30w) for activating a Compact Disk Write module (32);

(h) said CD Write module (32) for burning said text stream data file (25) containing both data and digital signature onto a compact disk (34).

7. The system of claim 6 which includes:

(i) client-user terminal means for initiating said Compact Disk Write package unit (30w) to burn said data file (25) onto said compact disk as a standard text stream data file with a digital signature.

8. A system for converting specialized first format data files into second format protocol data files compatible for Internet transmission and each of which data files is provided with a digital signature for verification of the file's integrity, said system comprising:

(a) means for creating a specialized keysfile (DSAKEYSFILE) which holds a series of digital signature information sets;

(b) means to institute a wrapping procedure for transforming said specialized first format data file into a text stream data file suitable for the Internet said wrapping procedure incorporating a set of digital signature parameters from said DSAKEYSFILE, along with a digital signature private key in order to create a digitally signatured file which includes the converted data plus a digital signature which later can be used to verify the integrity of said converted data file.

9. A system whereby a User in transporting data from a Sending platform to a Recipient platform can convert (wrap) a first data file from a first proprietary format into a second data file having an industry standard text stream data format while concurrently creating an embedded digital signature in said second data file comprising:

(a) means for utilizing a specialized Digital Signal Algorithm keysfile (DSAKEYSFILE) to store bits of digital signal information having specialized parameters, and including:

(a1) means to generate sets of Public/Private key-pairs;

(b) means for converting said first data file into said second data file having an industry standard text stream data format which includes an embedded digital signature derived from said DSAKEYSFILE;

(c) means to develop an industry standard embedded signatured text file of said second data file by utilizing the data of said second data file, with said specialized parameters of said DSAKEYSFILE and a User-supplied Private Key.

(d) means to transfer said digitally signatured second file with its embedded signatured to said Recipient platform;

(e) means to separately convey the corresponding Public Key to said Recipient platform.

10. The system of claim 9 where said specialized parameters of said DSAKEYSFILE include:

(i) an ID string for each set of digital signature information;

(ii) the value of the Software Release Level (SSR) involved;

(iii) three prime numbers P,Q,G in said Sending platform used for calculating a specific signature via a signature program (MCP_GENERATEDSAKEYS);

(iv) a special Public Key derived from the prime numbers P,Q,G for the specific SSR level involved.

11. In a Sending platform with a Master Control Program (MCP) means holding a DSAKEYSFILE, a signature program (MCP_GENERATEDSAKEYS), and conversion program means for converting a first native file into an industry standard text file having an embedded digital signature as a second file which can be received by a recipient platform with verification as to the integrity of the received second file, a method for digitally signaturing said converted second file which will enable said recipient platform to automatically verify the integrity of said received second file, comprising the steps of:

(a) utilizing a Digital Signal Algorithm Keysfile (DSAKEYSFILE) to generate sets of Public/Private Key-Pairs;

(b) using said Private Key of a selected Key-Pair together with specialized parameters in said MCP means to embed a digital signature into said converted second file;

(c) transmitting said signatured second file to said recipient platform;

(d) separately transmitting, by any suitable means, said Public Key of said selected Key-Pair to said recipient platform for automatically enabling said recipient platform to verify the integrity of said signatured second file, without need for operator intervention.

12. The method of claim 11 wherein step (b) includes the steps of:

(b1) using said specialized parameters with the values of:
(i) ID string for the set;
(ii) the value of the Software Release Level (SSR);
(iii) three prime numbers designated as P,Q,G used for calculating a signature;
(iv) a proprietary system Public Key derived from the prime numbers in item (iii) above for the particular SSR indicated in item (ii).

* * * * *